(12) United States Patent
Makino et al.

(10) Patent No.: US 11,038,198 B2
(45) Date of Patent: Jun. 15, 2021

(54) SOLID ELECTROLYTE AND METHOD FOR PRODUCING SOLID ELECTROLYTE

(71) Applicant: IDEMITSU KOSAN CO., LTD., Tokyo (JP)

(72) Inventors: Takeshi Makino, Chiba (JP); Hiroaki Yamada, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 1 day.

(21) Appl. No.: 16/084,114

(22) PCT Filed: Mar. 14, 2017

(86) PCT No.: PCT/JP2017/010155
§ 371 (c)(1),
(2) Date: Sep. 11, 2018

(87) PCT Pub. No.: WO2017/159667
PCT Pub. Date: Sep. 21, 2017

(65) Prior Publication Data
US 2019/0074542 A1 Mar. 7, 2019

(30) Foreign Application Priority Data
Mar. 14, 2016 (JP) .............................. JP2016-049548

(51) Int. Cl.
*H01M 10/056* (2010.01)
*H01M 10/0562* (2010.01)
(Continued)

(52) U.S. Cl.
CPC ............ *H01M 10/0562* (2013.01); *C03C 3/32* (2013.01); *C03C 4/14* (2013.01); *C03C 10/16* (2013.01);
(Continued)

(58) Field of Classification Search
None
See application file for complete search history.

(56) References Cited

U.S. PATENT DOCUMENTS 8,075,865 B2 12/2011 Deiseroth et al.
8,962,194 B2 2/2015 Senga et al.
(Continued)

FOREIGN PATENT DOCUMENTS

CN 101013761 A 8/2007
CN 105186014 A 12/2015
(Continued)

OTHER PUBLICATIONS

International Search Report for PCT/JP2017/010155 dated Apr. 25, 2017.
(Continued)

*Primary Examiner* — Amanda C. Walke
(74) *Attorney, Agent, or Firm* — Millen, White, Zelano & Branigan, PC; Ryan Pool

(57) ABSTRACT

Provided is a solid electrolyte having a high ion conductivity and excellent in battery performance not going through a step of removing water such as a drying step, while simplifying the production process and reducing the production cost. Specifically, provided is a method for producing a sulfide-based solid electrolyte, including causing a reaction of an alkali metal sulfide and a specific substance in a solvent.

18 Claims, 13 Drawing Sheets

(51) Int. Cl.
*C03C 3/32* (2006.01)
*C03C 4/14* (2006.01)
*C03C 10/16* (2006.01)
*H01B 1/10* (2006.01)
*H01B 13/00* (2006.01)
*H01M 10/052* (2010.01)
*H01M 10/0525* (2010.01)

(52) U.S. Cl.
CPC ............... *H01B 1/10* (2013.01); *H01B 13/00* (2013.01); *H01M 10/052* (2013.01); *H01M 10/0525* (2013.01); *H01M 2300/008* (2013.01)

(56) References Cited

U.S. PATENT DOCUMENTS

| | | | |
|---|---|---|---|
| 9,172,113 B2 * | 10/2015 | Ohtomo | H01M 10/0562 |
| 9,444,121 B2 | 9/2016 | Yanagi et al. | |
| 9,620,811 B2 | 4/2017 | Kambara et al. | |
| 9,680,179 B2 | 6/2017 | Tsuchida et al. | |
| 9,806,373 B2 | 10/2017 | Kambara et al. | |
| 9,819,024 B2 * | 11/2017 | Chao | H01M 4/505 |
| 10,050,284 B2 | 8/2018 | Zhu et al. | |
| 2004/0033191 A1 * | 2/2004 | Wietelmann | H01M 6/164 |
| | | | 423/499.1 |
| 2007/0160911 A1 | 7/2007 | Senga et al. | |
| 2010/0290969 A1 * | 11/2010 | Deiseroth | H01M 6/185 |
| | | | 423/300 |
| 2013/0177821 A1 | 7/2013 | Tsuchida et al. | |
| 2014/0192309 A1 | 7/2014 | Nakagawa et al. | |
| 2014/0272554 A1 | 9/2014 | Yanagi et al. | |
| 2014/0302382 A1 * | 10/2014 | Kambara | H01B 1/122 |
| | | | 429/162 |
| 2016/0104917 A1 | 4/2016 | Sato et al. | |
| 2017/0162901 A1 * | 6/2017 | Chen | H01M 10/0525 |
| 2017/0194662 A1 | 7/2017 | Kambara et al. | |
| 2020/0168944 A1 * | 5/2020 | Makino | H01B 1/10 |

FOREIGN PATENT DOCUMENTS

| | | |
|---|---|---|
| JP | 2005228570 A | 8/2005 |
| JP | 2013103851 A | 5/2013 |
| JP | 2013201110 A | 10/2013 |
| JP | 2013256416 A | 12/2013 |
| JP | 2014065637 A | 4/2014 |
| JP | 2014065638 A | 4/2014 |
| JP | 2014102987 A | 6/2014 |
| WO | 13005085 A1 | 1/2013 |
| WO | 2014192309 A1 | 12/2014 |

OTHER PUBLICATIONS

Koh, T. et al., "Spectrophotometric Determination of Micro Amounts of Sulfide, Sulfate and Thiosulfate," Analytical Sciences, Dec. 1987, vol. 3, pp. 543-547.
English Abstract for JP2013103851, Publication Date: May 30, 2013.
English Abstract for JP2013256416, Publication Date: Dec. 26, 2013.
English Abstract for JP2014065637, Publication Date: Apr. 17, 2014.
English Abstract for JP2014065638, Publication Date: Apr. 17, 2014.
Supplementary search report in corresponding EP 17766666.6 dated Sep. 18, 2019 (pp. 1-9).
Office Action in corresponding CN application 201780017180.6 dated Oct. 21, 2019.

* cited by examiner

Figure 4
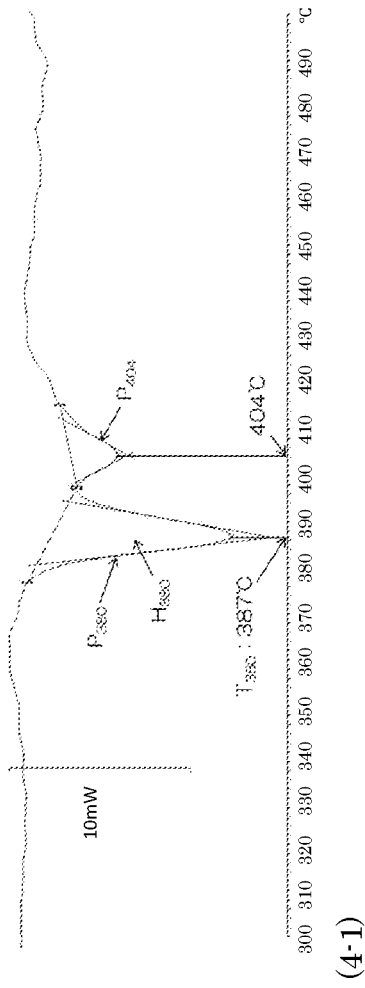
(4-1)
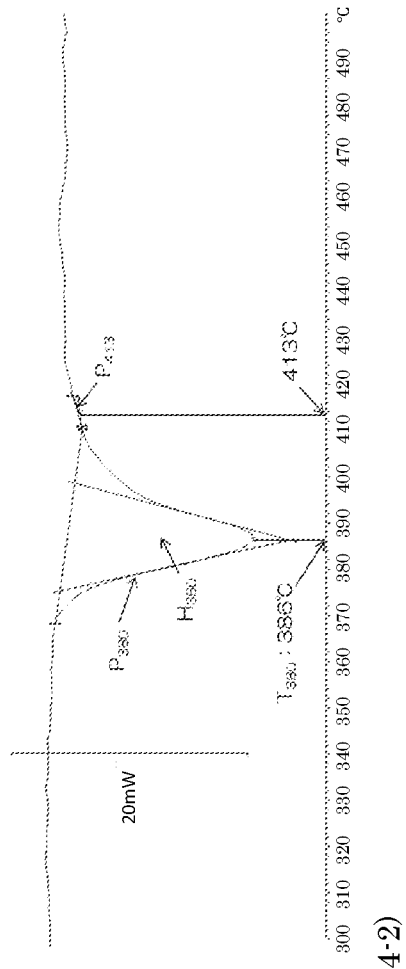
(4-2)

SOLID ELECTROLYTE AND METHOD FOR PRODUCING SOLID ELECTROLYTE

TECHNICAL FIELD

The present invention relates to a solid electrolyte and a method for producing a solid electrolyte.

BACKGROUND ART

In the field of all-solid batteries, heretofore, a sulfide-based solid electrolyte material has been known. For example, PTL 1 reports producing a sulfide glass by reaction of lithium sulfide and phosphorus sulfide followed by heat-treating the sulfide glass to give a glass ceramic electrolyte having a high ion conductivity (for example, see PTL 1). However, a higher ion conductivity is desired, and it is reported to produce a sulfide glass by reaction of lithium halide, lithium sulfide and phosphorus sulfide and to heat-treat the sulfide glass to give a glass ceramic electrolyte having a high ion conductivity (for example, see PTL 2).

The lithium halide contained in these raw material compositions is produced using a raw material that is an aqueous solution in the production process, or is produced through reaction in water, and therefore the lithium halide is produced as a hydrate thereof (for example, see PTLs 3 to 6). When the lithium halide to be used as a raw material for a solid electrolyte contains water, the ion conductivity of the sulfide-based solid electrolyte may lower, and therefore, water must be removed from the lithium halide.

CITATION LIST

Patent Literature

PTL 1: JP-2005-228570A
PTL 2: JP-2013-201110A
PTL 3: JP-2013-103851A
PTL 4: JP-2013-256416A
PTL 5: JP-2014-65637A
PTL 6: JP-2014-65638A

BRIEF DESCRIPTION OF DRAWINGS

FIG. 4 is a DTA chart up to 300 to 500° C. in differential thermal analysis for explaining the absolute value of a heat quantity $H_{380}$ of an endothermic peak.

SUMMARY OF INVENTION

Technical Problem

Figure 1:
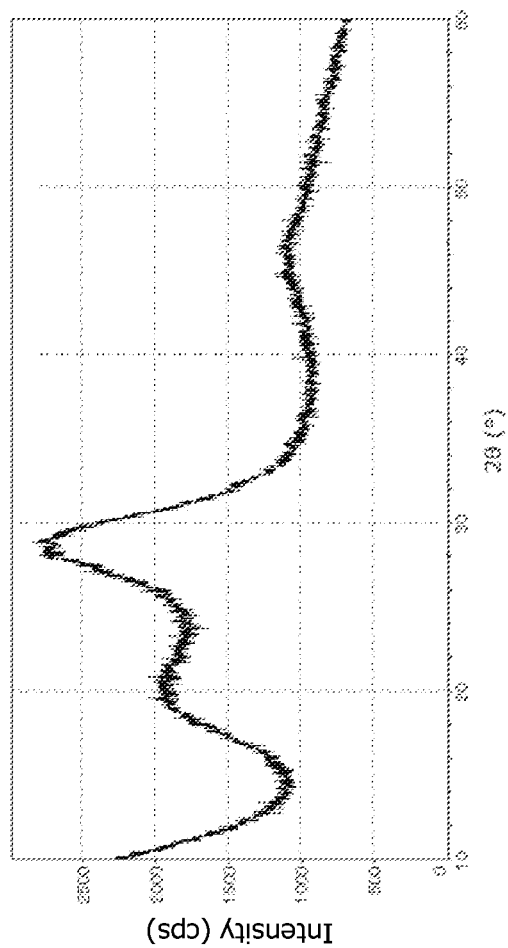
FIG. 1 is an X-ray analysis spectrum of the amorphous sulfide-based solid electrolyte obtained in Example 1A.

If existing in a raw material for a solid electrolyte, water greatly lowers ion conductivity to cause a problem that an excellent solid electrolyte could not be obtained. On the other hand, a lithium halide to be the raw material is produced using water as a medium, heretofore as described in PTLs 3 to 6, and therefore in any case, a step of removing water is necessary. Specifically, water removal is carried out according to a method of baking at 300 to 440° C. in an inert gas atmosphere or in vacuum (PTL 3), or drying in azeotropy with an organic solvent (PTL 4), or heating under reduced pressure (PTLs 5 and 6).

However, water removal is not easy, and as described above, various ingenuities are necessary (PTLs 3 to 6). For example, when a drying step is carried out under reduced pressure with heating, the production process is complicated and large-scaled to cause a problem of time and money. In that manner, a solid electrolyte using a lithium halide as a raw material has advantages of high ion conductivity and excellent battery performance, but on the other hand, the energy for water removal is great and the production process is complicated and large-scaled to lead to higher costs, and as a result, the solid electrolyte is expensive.

In particular, recently, with rapid popularization of information-related devices and communication devices and with technical advancement in performance thereof, more inexpensiveness and higher lithium ion conductivity have become desired. To satisfy these requirements, investigations from the aspect of production processes and investigations in other various aspects are being made.

The present invention has been made in consideration of the situation as above, and an object thereof is to provide a sulfide-based solid electrolyte having a high ion conductivity and to provide a method for producing a sulfide-based solid electrolyte in which the production process is simplified.

Solution to Problem

For solving the above-mentioned problems, the present inventors have assiduously studied and, as a result, have found that the problems can be solved by the following invention.

[1] A method for producing a sulfide-based solid electrolyte, including causing a reaction of an alkali metal sulfide and a substance represented by the formula (1) in a solvent:

$$X_2 \tag{1}$$

wherein X represents a halogen element.

[2] A method for producing a sulfide-based solid electrolyte, including causing a reaction of an alkali metal sulfide and a substance represented by the formula (1) and a phosphorus compound in a solvent:

$$X_2 \quad (1)$$

wherein X represents a halogen element.

[3] A sulfide-based solid electrolyte containing an alkali metal element, a sulfur element and a halogen element, which is such that the absolute value of the heat quantity $H_{380}$ of an endothermic peak that has a peak top at 380±15° C., as measured in differential heat analysis under a heating condition of 10° C./min, is 10 (J/g) or more.

Advantageous Effects of Invention

According to the present invention, there can be provided a sulfide-based solid electrolyte having a high ion conductivity and a method for producing a sulfide-based solid electrolyte in which the production process is simplified.

DESCRIPTION OF EMBODIMENTS

Embodiments of the present invention (which may be hereinafter referred to as "the present embodiments") are described below.

[Method for Producing Sulfide-Based Solid Electrolyte]

The method for producing a sulfide-based solid electrolyte of this embodiment is a method for producing a sulfide-based solid electrolyte, including causing a reaction of an alkali metal sulfide and a substance represented by the formula (1) (which may be hereinafter referred to as "substance $X_2$"):

$$X_2 \quad (1)$$

wherein X represents a halogen element.

The sulfide-based solid electrolyte is a solid electrolyte having sulfur as an indispensable component, and means an electrolyte that maintains a solid form at 25° C. in a nitrogen atmosphere.

The sulfide-based solid electrolyte includes both an amorphous sulfide-based solid electrolyte and a crystalline sulfide-based solid electrolyte having a crystal structure. These sulfide-based solid electrolytes will be described in detail hereinunder.

The sulfide-based solid electrolyte preferably contains sulfur and phosphorus, more preferably contains at least one selected from lithium and sodium, and sulfur and phosphorus, and even more preferably contains lithium, sulfur and phosphorus. Specifically, the sulfide-based solid electrolyte preferably has lithium ion conductivity and sodium ion conductivity.

[Alkali Metal Sulfide]

The alkali metal sulfide is preferably granular.

Here, the mean particle size ($D_{50}$) of the alkali metal sulfide particles is preferably 10 μm or more and 2,000 μm or less, more preferably 30 μm or more and 1500 μm or less, even more preferably 50 μm or more and 1,000 μm or less. In this description, the mean particle size ($D_{50}$) means a particle size to reach 50% of all the particles as sequentially integrated from the particles having a smallest particle size on the particle size distribution cumulative curve drawn with particles, and the volumetric distribution is, for example, mean particle size that can be measured using a laser diffraction/scattering particle size distribution measuring device.

Preferred examples of the alkali metal sulfide for use in this embodiment include lithium sulfide ($Li_2S$), sodium sulfide ($Na_2S$), potassium sulfide ($K_2S$), rubidium sulfide ($Rb_2S$), and cesium sulfide ($Cs_2S$). In consideration of the fact that when an alkali metal having a smaller molecular weight is used, the ion conductivity of the resultant sulfide-based solid electrolyte tends to increase, lithium sulfide ($Li_2S$) and sodium sulfide ($Na_2S$) are preferred, and lithium sulfide ($Li_2S$) is more preferred.

One alone of these alkali metal sulfides may be used singly or plural kinds thereof may be used in combination, and in the case where plural kinds are used as combined, a combination of lithium sulfide ($Li_2S$) and sodium sulfide ($Na_2S$) is preferred from the viewpoint of increasing ion conductivity. Sodium is an alkali metal whose atomic weight is larger than that of lithium, and therefore in consideration of the fact that, using a light alkali metal, the ion conductivity of the resultant sulfide-based solid electrolyte tends to increase, using lithium sulfide ($Li_2S$) singly is especially preferred.

Preferably, the alkali metal sulfide does not contain water, and the amount of water to be contained as an impurity is preferably 100 ppm by mass or less, more preferably 80 ppm by mass or less, even more preferably 50 ppm by mass or less, further more preferably 30 ppm by mass or less, and especially preferably 20 ppm by mass or less. The water content as above does not worsen the performance of the resultant sulfide-based solid electrolyte.

The alkali metal sulfide usable in this embodiment is as described above, and an example of a method for producing lithium sulfide is described below.

Lithium sulfide can be produced, for example, according to the method described in JP-7-330312A, JP-9-283156A, JP-2010-163356A, and JP-9-278423A.

Specifically, lithium hydroxide is reacted with hydrogen sulfide in a hydrocarbon-based organic solvent at 70° C. to 300° C. to give lithium hydrosulfide, and next, the reaction liquid is dehydrosulfurized to give lithium sulfide (JP-2010-163356A). Alternatively, lithium hydroxide is reacted with hydrogen sulfide at 130° C. or higher and 445° C. or lower to synthesize lithium sulfide (JP-9-278423A).

[Substance $X_2$]

The substance $X_2$ includes fluorine ($F_2$), chlorine ($Cl_2$), bromine ($Br_2$), and iodine ($I_2$), and above all, chlorine ($Cl_2$), bromine ($Br_2$), and iodine ($I_2$) are preferred, and one alone or plural kinds thereof may be used either singly or as combined. Using the above as the substance $X_2$ increases the probability of producing an electrolyte having a high ion conductivity. From the same viewpoint, the substance $X_2$ is more preferably bromine ($Br_2$), or iodine ($I_2$).

Since the substance $X_2$ is used as a raw material, it is unnecessary to use an alkali metal halide as a raw material, and in particular, the step of removing water necessary in producing lithium bromide (LiBr) and lithium iodide (LiI) can be omitted, and accordingly, a high-performance solid electrolyte can be provided while the production process is simplified and the production cost is reduced.

Preferably, the amount of water as an impurity in the substance $X_2$ is small.

[Phosphorus Compound]

In this embodiment, preferably, an alkali metal sulfide and a phosphorus compound and a substance $X_2$ are reacted.

Preferred examples of the phosphorus compound include phosphorus sulfides such as diphosphorus trisulfide ($P_2S_3$), and diphosphorus pentasulfide ($P_2S_5$); and phosphate compounds such as sodium phosphate ($Na_3PO_4$), and lithium phosphate ($Li_3PO_4$). Above all, phosphorus sulfides are preferred, and diphosphorus pentasulfide ($P_2S_5$) is more preferred. The phosphorus compound may include an elemental phosphorus. The phosphorus compounds such as diphosphorus pentasulfide ($P_2S_5$) that are industrially produced and sold are readily available. These phosphorus compounds may be used alone or plural kinds thereof may be used in combination.

[Other Raw Materials]

In this embodiment, so far as the above-mentioned alkali metal sulfide and the substance $X_2$, preferably the alkali metal sulfide, the phosphorus compound and the substance $X_2$ are used, any other raw materials than the above may also be contained.

For example, using a sodium halide such as sodium iodide (NaI), sodium fluoride (NaF), sodium chloride (NaCl) or sodium bromide (NaBr), or a lithium compound such as lithium oxide ($Li_2O$), or lithium carbonate ($Li_2CO_3$), an alkali metal element (lithium (Li)) may be supplied.

Using a metal sulfide such as silicon sulfide ($SiS_2$), germanium sulfide ($GeS_2$), boron sulfide ($B_2S_3$), gallium sulfide ($Ga_2S_3$), tin sulfide (SnS or $SnS_2$), aluminum sulfide ($Al_2S_3$), or zinc sulfide (ZnS), a sulfur atom may be supplied.

Using phosphorus halides such as various phosphorus fluorides ($PF_3$, $PF_5$), various phosphorus chlorides ($PCl_3$, $PCl_5$, $P_2Cl_4$), phosphorus oxychloride ($POCl_3$), various phosphorus bromides ($PBr_3$, $PBr_5$), phosphorus oxybromide ($POBr_3$), and various phosphorus iodides ($PI_3$, $P_2I_4$), a phosphorus element and a halogen element may be supplied at the same time. In addition, using a thiophosphoryl halide such as thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2S$), or thiophosphoryl dibromofluoride ($PSBr_2F$), a phosphorus element, a sulfur element and a halogen element may be supplied at the same time.

Using a metal halide such as an aluminum halide, a silicon halide, a germanium halide, an arsenic halide, a selenium halide, a tin halide, an antimony halide, a tellurium halide or a bismuth halide, a halogen element may be supplied.

In addition, for example, within a range not detracting from the advantageous effects of the present invention, a lithium halide such as lithium fluoride (LiF), lithium chloride (LiCl), lithium bromide (LiBr) or lithium iodide (LiI) may be used to supply a lithium element and a halogen element.

In the production method of this embodiment, a solid electrolyte containing an alkali metal element, a phosphorus element and a sulfur element may be used as a raw material. Examples of such a solid electrolyte include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$—$P_2S_5$—LiI, and $Li_2S$—$P_2S_5$—$Z_mS_n$ (where m and n each represent a positive number, and Z is any of Si, Ge, Zn, Ga, Sn or Al). As known from these exemplifications, a solid electrolyte containing a halogen element, an oxygen element and any other element may be used as a raw material so far as it contains an alkali metal element, a phosphorus element and a sulfur element.

For example, in the case where $Li_2S$—$P_2S_5$ is used as a raw material, at least any one of iodine ($I_2$) and bromine ($Br_2$) may be supplied as an elemental halogen. In this case, iodine ($I_2$) alone may be supplied as an elemental halogen and lithium bromide (LiBr) may be used as a supply source a bromine element, or a raw material containing any other halogen atom may also be used. Depending on the solid electrolyte to be used as a raw material and on the intended solid electrolyte, any ones may be appropriately selected from those exemplified above and may be used as raw materials.

Among the above, also in the case where a solid electrolyte not having a halogen atom such as $Li_2S$—$P_2S_5$—$Li_2O$ or $Li_2S$—$P_2S_5$—$Z_mS_n$ is used as a raw material, a solid electrolyte containing a halogen atom may be produced in the same manner as that using $Li_2S$—$P_2S_5$.

In addition, for example, in the case where $Li_2S$—$P_2S_5$—LiBr is used as a raw material, a solid electrolyte containing an iodine element may be produced using iodine ($I_2$) as an elemental halogen.

[Blending Ratio of Raw Materials]

The proportion of each raw material in all raw materials is not specifically limited, and for example, in the case where lithium sulfide ($Li_2S$) and diphosphorus pentasulfide ($P_2S_5$) are used as raw materials, the ratio of the molar number of lithium sulfide ($Li_2S$) excluding the same molar number of lithium sulfide ($Li_2S$) as the molar number of the substance $X_2$, relative to the total molar number of lithium sulfide ($Li_2S$) and diphosphorus pentasulfide ($P_2S_5$) excluding the same molar number of lithium sulfide ($Li_2S$) as the molar number of the substance $X_2$ is preferably within a range of 60 to 90%, more preferably within a range of 65 to 85%, even more preferably within a range of 68 to 82%, still more preferably within a range of 72 to 78%, and especially preferably within a range of 73 to 77%. This is because, falling within the range of such proportion, a sulfide-based solid electrolyte having a high ion conductivity can be obtained.

In the case where an alkali metal sulfide, a phosphorus compound and a substance $X_2$ are used as raw materials, the content of the substance $X_2$ relative to the total amount of the alkali metal sulfide, the phosphorus compound and the substance $X_2$ is preferably 1 to 50 mol %, more preferably 2 to 40 mol %, even more preferably 3 to 25 mol %, and still more preferably 3 to 15 mol %.

In the case where an alkali metal sulfide, a phosphorus compound, a substance $X_2$, and a lithium halide are used as raw materials, the content ($\alpha$ mol %) of the substance $X_2$ and the content ($\beta$ mol %) of the lithium halide relative to the total amount of these preferably satisfy the following expression (2), more preferably satisfy the following expression (3), even more preferably satisfy the following expression (4), and further more preferably satisfy the following expression (5).

$$2 \leq 2\alpha + \beta \leq 100 \quad (2)$$

$$4 \leq 2\alpha + \beta \leq 80 \quad (3)$$

$$6 \leq 2\alpha + \beta \leq 50 \quad (4)$$

$$6 \leq 2\alpha + \beta \leq 30 \quad (5)$$

In the case where two kinds of halogen elements are contained in the raw material and where the molar number of one halogen atom in the raw material is represented by A1 and the molar number of the other halogen atom therein is represented by A2, preferably A1/A2 is (1 to 99)/(99 to 1), more preferably 10/90 to 90/10, even more preferably 20/80 to 80/20, and further more preferably 30/70 to 70/30.

In the case where a bromine element and an iodine element are contained as halogen atoms in the raw material and where the molar number of the bromine element in the raw material is represented by B1 and the molar number of the iodine element in the raw material is represented by B2, preferably B1/B2 is (1 to 99)/(99 to 1), more preferably 15/85 to 90/10, even more preferably 20/80 to 80/20, furthermore preferably 30/70 to 75/25, and especially preferably 35/65 to 75/25.

[Solvent]

The solvent for use in this embodiment is preferably one in which the solubility of the substance $X_2$ is 0.01% by mass or more.

As described above, in the production method of this embodiment, a substance $X_2$ is used as a raw material in place of a lithium halide such as lithium iodide (LiI) heretofore used for producing a high-performance solid electrolyte therefore evading water removal in the production process for the lithium halide, and consequently a high-performance solid electrolyte can be provided while the production process is simplified and the production cost is reduced. On the other hand, the substance $X_2$ has a property of locally fracturing a passive-state coating film to accelerate local corrosion, especially crevice corrosion, and therefore, when the substance $X_2$ is kept in direct contact with a production device, it would accelerate corrosion of the production device.

In the production method of this embodiment, a solvent in which the solubility of the substance $X_2$ is 0.01% by mass or more is used, and therefore the raw materials can be reacted more smoothly and the risk of direct contact between the substance $X_2$ and a production device can be reduced to more readily prevent corrosion of the production device. In addition, the substance $X_2$ dissolves in the solvent and therefore the unreacted substance $X_2$ can be readily removed from the sulfide-based solid electrolyte, and consequently, a sulfide-based solid electrolyte where the substance $X_2$ does not exist as an impurity or may exist little can be obtained.

From the same viewpoint as above, the solubility of the substance $X_2$ is preferably 0.03% by mass or more, more preferably 0.05% by mass or more, even more preferably 0.1% by mass or more. The upper limit is not specifically limited, and for example, the solubility may be 60% by mass or less, or 55% by mass or less, or 10% by mass or less.

The solubility of the substance $X_2$ is a value measured according to the following measurement method.

(Measurement of Solubility of Substance $X_2$)

A substance $X_2$ (2 g) is dissolved in 3 mL of a solvent, and stirred at room temperature (25° C.) for 20 minutes. 0.1 g of the supernatant is weighed, 1 g of an aqueous sodium thiosulfate solution (10% by mass, $Na_2S_2O_3$) is added to the supernatant and shaken for about 1 minute to confirm disappearance of the color of the solution. The iodine concentration of the solution is quantified through ICP emission spectrometric analysis (high-frequency inductively-coupled plasma emission spectrometry) to calculate the solubility of the substance $X_2$.

The solvent is preferably one capable of readily dissolving sulfur, for example, a solvent having a sulfur solubility of 0.01% by mass or more. The sulfur solubility in the solvent is more preferably 0.03% by mass or more, even more preferably 0.05% by mass or more, especially preferably 0.1% by mass or more, and the upper limit of the sulfur solubility is not specifically limited. For example, the solubility may be 60% by mass or less, 55% by mass or less or 10% by mass or less.

Here, the sulfur solubility is a value measured as follows.

(Measurement of Sulfur Solubility)

50 mL of a solvent is added to 10 g of sulfur, conditioned at 25° C. in an oil bath, and stirred for 2 hours. Subsequently, the supernatant was separated using a cannula (transport pipe) equipped with a glass filter. The separated supernatant was vacuumed to give dry sulfur. From the mass of the dry sulfur and the mass of the solvent in which the dry sulfur dissolved, the sulfur solubility (% by mass) is calculated.

In the production method of this embodiment, as described above, a substance $X_2$ (for example, iodine ($I_2$), bromine ($Br_2$)) is used as a raw material in place of the lithium halide such as lithium iodide (LiI) or lithium bromide (LiBr) heretofore used for producing a high-performance solid electrolyte therefore evading water removal in the production process for the lithium halide, and consequently a high-performance solid electrolyte can be provided while the production process is simplified and the production cost is reduced. Consequently, the alkali metal component that has heretofore been supplied as a lithium halide must be supplied as an alkali metal sulfide, and as a result, sulfur may form as a side product.

In the production method of this embodiment, preferably, a solvent having a sulfur solubility of 0.01% by mass or more is used, and therefore the raw materials can be reacted more smoothly and any excessive sulfur component, if generated, can be removed, consequently enhancing the production efficiency. In addition, sulfur dissolves in the solvent, and therefore the unreacted sulfur can be readily removed from the sulfide-based solid electrolyte, and a sulfide-based solid electrolyte not containing sulfur as an impurity or containing little sulfur can be provided.

The solvent is preferably one hardly dissolving an alkali metal sulfide, for example, a solvent having an alkali metal sulfide solubility of 1% by mass or less. Using such a solvent, the amount of dissolution of an alkali metal sulfide in the solvent can be reduced, and consequently, the alkali metal sulfide can be consumed more efficiently for the reaction with the substance $X_2$. The solubility of the alkali metal sulfide is more preferably 0.5% by mass or less, even more preferably 0.1% by mass or less, and further more preferably 0.07% by mass or less. The lower limit of the alkali metal sulfide solubility is not limited.

Preferred examples of such a solvent include hydrocarbon solvents such as aliphatic hydrocarbon solvents, alicyclic hydrocarbon solvents, and aromatic hydrocarbon solvents; and carbon atom-containing solvents such as solvents containing a carbon atom and a hetero atom.

Examples of the aliphatic hydrocarbon solvent include hexane, pentane, 2-ethylhexane, heptane, octane, decane, undecane, dodecane, and tridecene; examples of the alicyclic hydrocarbon solvent include cyclohexane, and methylcyclohexane; examples of the aromatic hydrocarbon solvent include benzene, toluene, xylene, mesitylene, ethylbenzene, tert-butylbenzene, chlorobenzene, trifluoromethylbenzene, and nitrobenzene; and examples of the solvent containing a carbon atom and a hetero atom include carbon disulfide, diethyl ether, dibutyl ether, and tetrahydrofuran.

Among these, hydrocarbon solvents are preferred, aromatic hydrocarbon solvents are more preferred, toluene, xylene and ethylbenzene are even more preferred, and toluene is especially preferred. Water is unfavorable as a solvent as it may worsen the performance of the solid electrolyte.

In the case where bromine ($Br_2$) is used as the substance $X_2$, from the viewpoint of efficiently attaining the reaction between the bromine ($Br_2$) and the other raw material, especially among saturated aliphatic hydrocarbon solvents, saturated alicyclic hydrocarbon solvents and aromatic hydrocarbon solvent, those substituted with an electrophilic group, for example, tert-butylbenzene, trifluoromethylbenzene and nitrobenzene are preferably used.

The amount of the solvent to be used is preferably such that the total amount of the raw materials could be 0.1 to 1 kg in 1 liter of the solvent, more preferably 0.05 to 0.8 kg, even more preferably 0.2 to 0.7 kg. When the amount of the solvent used falls within the above range, the raw materials can be slurry and can be more smoothly reacted, and in addition, solvent removal, if needed, can be attained with ease.

[Mixing, Stirring and Grinding]

When the raw materials of an alkali metal sulfide and a substance $X_2$ are reacted in the production method for a sulfide-based solid electrolyte of this embodiment, for example, these raw materials may be mixed, stirred or ground or may be processed through any of these treatments as combined, for the purpose of increasing the reaction speed to thereby efficiently produce a sulfide-based solid electrolyte.

The mixing method is not specifically limited. For example, raw materials and optionally a solvent may be put into a production device where the solvent and the raw materials can be mixed, and mixed therein. The production device is not specifically limited so far as raw materials and a solvent can be mixed therein, and for example, a medium-assisted grinding machine may be used.

Figure 3:
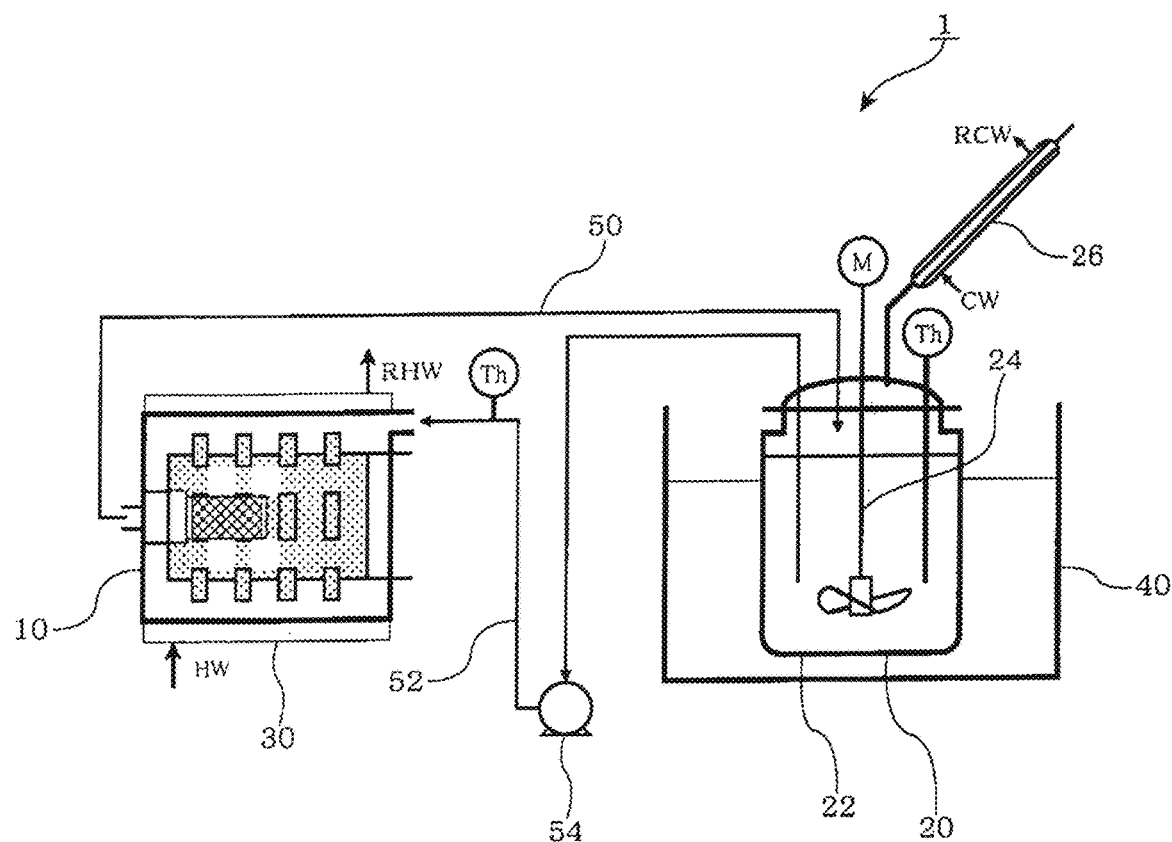
FIG. 3 is a schematic view of the apparatus used in Examples.

The medium-assisted grinding machine may be roughly grouped into a container-driven grinding machine and a medium-stirring grinding machine. The container-driven grinding machine includes a stirring tank, a grinding tank, and a ball mill and a bead mill including these as combined (for example, one having a configuration as shown in FIG. 3, as used in Examples). The medium-stirring grinding machine includes various types of grinding machines of an impact grinding machine such as a cutter mill, a hammer mill and a pin mill; a tower-type grinding machine such as a tower mill; a stirring tank grinding machine such as an attritor, an aquamizer, and a sand grinder; a fluid tank grinding machine such as a viscomill, and a pear mill; a fluid tube grinding machine; an annular type grinding machine such as a co-ball mill; a continuous dynamic grinding machine; and a monoaxial or multiaxial kneading machine.

These grinding machines may be appropriately selected depending on the intended size thereof, and for a relatively small-size system, a container-driven grinding machine such as a ball mill or a bead mill may be used, while for large-scale or industrial-scale mass production, the other types of grinding machines are preferably used.

When these grinding machines are used, raw materials and a solvent and also grinding media are put thereinto, and then the machine is driven to attain mixing, stirring and grinding therein. Here, raw materials, a solvent and grinding media are put into the machine, but the order of putting them thereinto is not limited.

In the production method for a sulfide-based solid electrolyte of this embodiment, raw material and a solvent are mixed, and therefore the raw materials can be brought into contact more readily to promote the reaction therebetween to give a sulfide-based solid electrolyte. From the viewpoint of promoting the contact between raw materials to give efficiently a sulfide-based solid electrolyte, it is desirable that a solvent and raw materials are mixed, and further stirred and ground, or processed for treatment of stirring and grinding. From the viewpoint of promoting the contact between raw materials, in particular, a treatment including grinding, namely a treatment of grinding, or stirring and grinding is preferably carried out. In the treatment of grinding, the surfaces of the raw materials may be cut off to make new surfaces thereof exposed out, and as a result, the new surfaces may be brought into contact with the surfaces of the other raw material to further promote the reaction between the raw materials to efficiently produce a sulfide-based solid electrolyte.

For example, a device of a ball mill or a bead mill is described as an example. In these mills, the grain size of the media therein such as balls or beads (balls generally have a size of $\phi 2$ to 20 mm or so, and beads generally have a size of $\phi 0.02$ to 2 mm or so, the material thereof (for example, metals such as stainless, chrome steel, or tungsten carbide; ceramics such as zirconia or silicon nitride; minerals such as agate), the rotation number of the rotor and the time may be selected to attain mixing, stirring or grinding, or a combined treatment thereof, and the particle size of the resultant sulfide-based solid electrolyte can be controlled.

In this embodiment, these conditions are not specifically limited. For example, using a ball mill, especially a planetary ball mill, and using balls of ceramics, above all zirconia balls having a size of $\phi 1$ to 10 mm, raw materials may be stirred and ground at a rotor rotation number of 300 to 1,000 rpm for 0.5 to 100 hours.

The temperature in mixing, stirring and grinding is not specifically limited, and may be, for example, 20 to 80° C.

In this embodiment, after raw materials and a solvent have been mixed, raw materials may be further added thereto and mixed, and this operation may be repeated twice or more.

In the case where raw materials and a solvent are mixed and stirred, additional raw materials may be further added and mixed during mixing and stirring them and/or after that, and this operation may be repeated twice or more. For example, raw materials and a solvent are put into a ball mill or a bead mill, and mixed and stirred therein, and during the mixing and stirring, additional raw materials may be further put into the container, and after mixing and stirring them (after the mixing and stirring is once stopped), raw materials may be put into the container, and mixing and stirring them may be restarted, or during mixing and stirring, and after that, additional raw materials may be put into the container.

Also in the case where raw materials and solvent are mixed and ground, or stirred and ground, additional raw materials may be further added like in the above-mentioned case of stirring.

In that manner, by further adding raw materials, the frequency of optional treatment of solvent removal or the like may be reduced, and accordingly, a sulfide-based solid electrolyte can be produced more efficiently.

In the case where additional raw materials are further added, if desired, a solvent may also be added, but the solvent will have to be removed in obtaining the intended sulfide-based solid electrolyte, the amount of the solvent to be additionally added is preferably minimized.

[Removal of Solvent]

Thus produced, the solid electrolyte contains a solvent. Consequently, in the production method for a solid electrolyte of this embodiment, preferably, the solvent is removed. By removing the solvent, the side product sulfur may also be removed.

The solvent removal may be carried out according to a method where the solvent-containing solid electrolyte is once transferred to a container, and after the solid electrolyte has deposited therein, the supernatant solvent is removed.

The solvent may be removed by drying, which may be combined with removal of the supernatant solvent. In this case, for example, the precipitated solid electrolyte is put on a heating device such as a hot plate, and then heated thereon at 50 to 90° C. to vaporize the solvent for solvent removal.

Depending on the solvent, reduced-pressure drying may be carried out using a vacuum pump or the like at a temperature of 90 to 110° C. or so. For example, this is effective for the case where an aromatic hydrocarbon solvent such as xylene, ethylbenzene or chlorobenzene is used.

The solvent to be used in this embodiment is one capable of dissolving the substance $X_2$, namely, the solubility of the substance $X_2$ therein is 0.01% by mass or more. Accordingly, an unreacted substance $X_2$ can be readily removed from the sulfide-based solid electrolyte, and the embodiment using the solvent is advantageous in that a sulfide-based solid electrolyte not containing or containing little amount of the substance $X_2$ as an impurity can be obtained.

[Amorphous Sulfide-Based Solid Electrolyte]

The resultant sulfide-based solid electrolyte is an amorphous sulfide-based solid electrolyte containing at least an alkali metal element, a sulfur element and a halogen element, preferably containing an alkali metal element, a sulfur element, a phosphorus element and a halogen element. In this description, the amorphous sulfide-based solid electrolyte means that the X-ray diffraction pattern thereof in X-ray diffractometry is a halo pattern not substantially showing any other peak than the materials-derived peaks, irrespective of the presence or absence of peaks derived from the raw materials of the solid electrolyte.

The amorphous sulfide-based solid electrolyte has a high ion conductivity and can increase battery output.

Typical examples of the amorphous sulfide-based solid electrolyte include $Li_2S$—$P_2S_5$—$LiI$, $Li_2S$—$P_2S_5$—$LiCl$, $Li_2S$—$P_2S_5$—$LiBr$, $Li_2S$—$P_2S_5$—$LiI$—$LiBr$, $Li_2S$—$P_2S_5$—$Li_2O$—$LiI$, and $Li_2S$—$SiS_2$—$P_2S_5$—$LiI$. The kind of the element constituting the amorphous sulfide-based solid electrolyte can be identified, for example, using an ICP emission spectrometric apparatus.

The shape of the amorphous sulfide-based solid electrolyte is not specifically limited, and is, for example, granular. The mean particle size ($D_{50}$) of the granular amorphous sulfide-based solid electrolyte is, for example, within a range of 0.01 μm to 500 μm, or 0.1 to 200 μm.

[Heating]

The production method for the solid electrolyte of this embodiment may further include heating. By further heating, the amorphous solid electrolyte may be converted into a crystalline solid electrolyte.

The heating temperature may be appropriately selected depending on the structure of the amorphous solid electrolyte, and may be, for example, within a range of the peak top, as a starting point, of the endothermic peak observed on the lowest temperature side in differential thermal analysis of the amorphous solid electrolyte under a heating rate of 10° C./min, preferably ±40° C., more preferably ±30° C., even more preferably ±20° C.

More specifically, the heating temperature is preferably 150° C. or higher, more preferably 170° C. or higher, even more preferably 190° C. or higher. On the other hand, the upper limit of the heating temperature is not specifically limited, and is preferably 300° C. or lower, more preferably 280° C. or lower, even more preferably 250° C. or lower.

The heating time is not specifically limited so far as a desired crystalline solid electrolyte can be produced within the time, and is, for example, preferably 1 minute or more, more preferably 10 minutes or more, even more preferably 30 minutes or more, and the upper limit of the heating time is not specifically limited, and is preferably 24 hours or less, more preferably 10 hours or less, even more preferably 5 hours or less.

Preferably, the heating is carried out in an inert gas atmosphere (for example, nitrogen atmosphere, argon atmosphere), or a reduced-pressure atmosphere (especially in vacuum). This is because the crystalline solid electrolyte can be prevented from being degraded (for example, oxidized). The heating method is not specifically limited, and for example, a method of using a vacuum heating apparatus, an argon gas atmosphere furnace or a baking furnace may be employed. Industrially, a horizontal drying machine, a horizontal shaking flow drying machine or the like having a heating means and a feeding mechanism may also be employed.

[Crystalline Sulfide-Based Solid Electrolyte]

As described above, a crystalline sulfide-based solid electrolyte can be obtained by heating an amorphous sulfide-based solid electrolyte. The crystalline sulfide-based solid electrolyte is a sulfide-based solid electrolyte whose X-ray diffraction pattern in X-ray diffractometry shows peaks derived from the sulfide-based solid electrolyte, irrespective of the presence or absence of peaks derived from the raw materials for the sulfide-based solid electrolyte therein. Specifically, the crystalline sulfide-based solid electrolyte contains a crystal structure derived from the sulfide-based solid electrolyte, and a part thereof may be a crystal structure derived from the sulfide-based solid electrolyte or all thereof may be a crystal structure derived from the sulfide-based solid electrolyte. With that, the crystalline sulfide-based solid electrolyte may contain, as a part thereof, an amorphous sulfide-based solid electrolyte so far as it has the X-ray diffraction pattern as mentioned above.

More specifically, examples of the crystal structure of the crystalline solid electrolyte include an $Li_3PS_4$ crystal structure, an $Li_4P_2S_6$ crystal structure, an $Li_7PS_6$ crystal structure, and a crystal structure having peaks at around 2θ=20.2° and 23.6° (for example, JP-2013-16423A).

Here, the crystal structure having peaks at around 2θ=20.2° and 23.6° is preferred. For example, it is a crystal structure having peaks at 2θ=20.2°±0.3° and 23.6°±0.3°.

The shape of the crystalline sulfide-based solid electrolyte is not specifically limited, and is, for example, granular. The mean particle size ($D_{50}$) of the granular crystalline sulfide-based solid electrolyte is, for example, within a range of 0.01 μm to 500 μm, or 0.1 to 200 μm.

The sulfide-based solid electrolyte obtained according to the production method of this embodiment has a high ion conductivity and excellent battery performance and is favorably used for batteries. Use of a lithium element as the conductor species is especially preferred. The sulfide-based solid electrolyte obtained according to the production method of this embodiment may be used as a positive electrode layer or a negative electrode layer, or may also be used as an electrolyte layer. Each layer may be produced according to a known method.

Preferably, the battery has a collector in addition to the positive electrode layer, the electrolyte layer and the negative electrode layer, and the collector may be any known one. For example, a layer of Au, Pt, Al, Ti, or a layer formed by coating one reactive with the sulfide-based solid electrolyte, such as Cu, with Au or the like may be used.

[Sulfide-Based Solid Electrolyte]

The sulfide-based solid electrolyte of this embodiment contains an alkali metal element, a sulfur element and a halogen element, and is such that the absolute value of the heat quantity $H_{380}$ of an endothermic peak that has a peak top at 380±15° C., as measured in differential heat analysis under a heating condition of 10° C./min, is 10 (J/g) or more. The present inventors have found that when the heat quantity of the endothermic peak expressing within a specific temperature range of 380±15° C. is larger, a higher ion conductivity tends to be attained. In addition, the inventors have further found that a solid electrolyte having such a characteristic can be obtained with ease according to the production method of this embodiment.

In this embodiment, the endothermic peak heat quantity is a heat quantity corresponding to the area of an endothermic peak measured in differential thermal analysis under a heating condition of 10° C./min. Hereinunder a method for determining the endothermic peak heat quantity is described more specifically.

FIG. 4 shows a differential thermal analysis chart (DTA chart) up to 300 to 500° C. in differential thermal analysis under a heating condition of 10° C./min of the sulfide-based solid electrolyte of this embodiment. The DTA chart shown in (4-1) of FIG. 4 is a chart of the sulfide-based solid electrolyte of Example 2B to be mentioned below, and in this chart, the endothermic peak ($P_{380}$ having a peak top at $T_{380}$=387° C. corresponds to the "endothermic peak having a peak top at 380±15° C.". In this embodiment, regarding the endothermic peak ($P_{380}$), the peak point between the endothermic peak ($P_{380}$) and the endothermic peak ($P_{404}$) having a peak top at 404° C., and the start point of the peak on the low temperature side of the endothermic peak ($P_{380}$) are connected with a straight line (hereinafter this may be referred to as a "straight line 1"), and the heat quantity corresponding to the area surrounded by that straight line, and the tangent line at the inflection point of the endothermic peak on the low temperature side of the endothermic peak ($P_{380}$), and the tangent line at the inflection point of the endothermic peak on the high temperature side thereof is referred to as the heat quantity $H_{380}$ of the endothermic peak having a peak top at 380±15° C. Here, the tangent line at the inflection point on the low temperature side of the endothermic peak and the tangent line at the inflection point on the high temperature side thereof are so employed that the difference between the area of the endothermic peak not allocated by the tangent lines and the area outside the endothermic peak counted by the tangent lines could be smaller. For example, in (4-1) of FIG. 4, the total of the area surrounded by the line 1 of the endothermic peak ($P_{380}$) and the tangent line on the low temperature side, and the area surrounded by the line 1 of the endothermic peak ($P_{380}$) and the tangent line on the high temperature side corresponds to the "area of the endothermic peak not to be allocated", and the total of the area surrounded by the tangent line on the low temperature side, the tangent line on the high temperature side and the endothermic peak ($P_{380}$) corresponds to the "area outside the endothermic peak to be allocated".

The DTA chart shown in (4-2) of FIG. 4 is a chart of the sulfide-based solid electrolyte of Example 4B to be mentioned below, and in this chart, the endothermic peak ($P_{380}$) having a peak top at $T_{380}$=386° C. corresponds to the "endothermic peak having a peak top at 380±15° C." ($P_{380}$). In the case of (4-2) of FIG. 4, an endothermic peak ($P_{413}$) having a peak top at 413° C. appears, but since this peak is small, it is hidden by the endothermic peak ($P_{380}$) to show a shoulder not having a valley between peaks. In this case, the peak point (shoulder part) between the endothermic peak ($P_{380}$) and the endothermic peak ($P_{413}$) having a peak top at 413° C., and the start point of the peak on the low temperature side of the endothermic peak ($P_{380}$) are connected with a straight line, and the heat quantity corresponding to the area surrounded by that straight line, and the tangent line at the inflection point of the endothermic peak on the low temperature side of the endothermic peak ($P_{380}$), and the tangent line at the inflection point of the endothermic peak on the high temperature side thereof may be referred to as the heat quantity $H_{380}$ of the endothermic peak having a peak top at 380±15° C. In the case where any other endothermic peak does not appear on the low temperature side and the high temperature side of the endothermic peak ($P_{380}$), the start point of the endothermic peak ($P_{380}$) is connected with the end point thereof via a straight line, and the heat quantity corresponding to the area surrounded by that straight line, the tangent line at the inflection point of the endothermic peak on the low temperature side of the endothermic peak ($P_{380}$) and the tangent line at the inflection point on the high temperature side thereof may be referred to as the heat quantity $H_{380}$ of the endothermic peak having a peak top at 380±15° C.

In this embodiment, the absolute value of the heat quantity $H_{380}$ of the endothermic peak having a peak top at 380±15° C. need to be 10 (J/g) or more. When the absolute value of the heat quantity $H_{380}$ is less than 10 (J/g), a high lithium ion conductivity could not be attained. From the viewpoint of attaining a higher lithium ion conductivity, the absolute value of the heat quantity $H_{380}$ is preferably 12 (J/g) or more, more preferably 15 (J/g) or more, even more preferably 20 (J/g) or more. The upper limit of the absolute value of the heat quantity $H_{380}$ is not specifically limited, but is generally 60 (J/g) or less, or 55 (J/g) or less, or 50 (J/g) or less.

In this embodiment, the ratio of the absolute value of the heat quantity $H_{380}$ of the endothermic peak, to the total $H_{350\text{-}450}$ of the absolute values of the heat quantities of the endothermic peaks each having a peak top at 350 to 450° C. ($H_{380}/H_{350\text{-}450}$) is preferably 50% or more. When the proportion ($H_{380}/H_{350\text{-}450}$) is 50% or more, a higher lithium ion conductivity can be attained. From the same viewpoint, the proportion ($H_{380}/H_{350\text{-}450}$) is preferably 60% or more, more preferably 70% or more, even more preferably 80% or more. The upper limit of the proportion ($H_{380}/H_{350\text{-}450}$) is preferably higher, and from the viewpoint of attaining a higher lithium ion conductivity, the proportion is especially preferably 100%.

Figure 5:
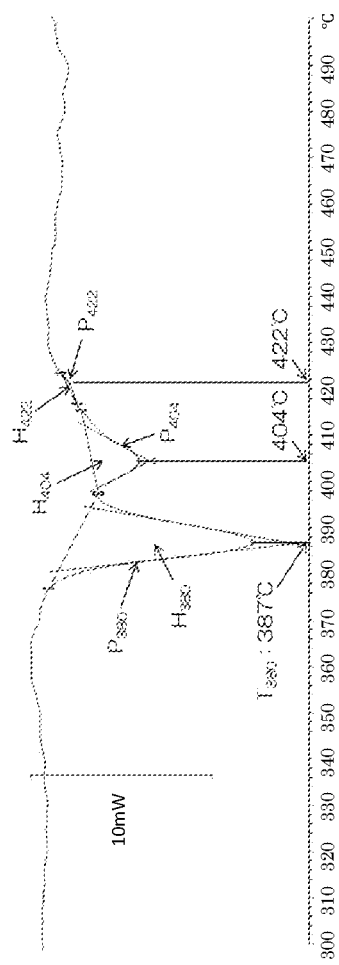
FIG. 5 is a DTA chart up to 300 to 500° C. in differential thermal analysis for explaining the absolute value of a heat quantity $H_{380}$ of an endothermic peak, which is a DTA chart of the solid electrolyte obtained in Example 2B.

The absolute value of the heat quantity $H_{380}$ of the endothermic peak in the proportion ($H_{380}/H_{350\text{-}450}$) is a value determined according to the above-mentioned method. The total $H_{350\text{-}450}$ of the absolute values of the heat quantities of the endothermic peaks each having a peak top at 350 to 450° C. is determined as follows. FIG. 5 is to specify the other endothermic peaks at 350 to 450° C. than the endothermic peak ($P_{380}$) having a peak top at $T_{380}$=387° C. corresponding to the "endothermic peak having a peak top at 380±15° C." in (4-1) of FIG. 4.

In FIG. 5, two endothermic peaks of an endothermic peak ($P_{404}$) having a peak top at 404° C. and an endothermic peak ($P_{422}$) having a peak top at 422° C. appear as the other endothermic peaks than the endothermic peak ($P_{380}$). The heat quantity $H_{404}$ and $H_{422}$ of these endothermic peaks may be determined in the same manner as that of the method of determining the endothermic peak ($P_{380}$) mentioned above.

In FIG. 5, the total $H_{350\text{-}450}$ of the absolute values of the heat quantities of the endothermic peaks each having a peak top at 350 to 450° C. in the proportion ($H_{380}/H_{350\text{-}450}$) is the total of the absolute value of the heat quantity $H_{380}$ of the endothermic peak ($P_{380}$) having a peak top at 380±15° C., the absolute value of the heat quantity $H_{404}$ of the endothermic peak ($P_{404}$) having a peak top at 404° C., and the absolute value of the heat quantity $H_{422}$ of the endothermic peak ($P_{422}$) having a peak top at 422° C.

More specifically, from Example 2B given below, the absolute value of the heat quantity $H_{380}$ of the endothermic peak ($P_{380}$) having a peak top at 380±15° C. is 26.12 (J/g), the absolute value of the heat quantity $H_{404}$ of the endothermic peak ($P_{404}$) having a peak top at 404° C. is 6.83 (J/g), and the absolute value of the heat quantity $H_{422}$ of the endothermic peak ($P_{422}$) having a peak top at 422° C. is 0.22 (J/g), and the total $H_{350-450}$ of these heat quantities is 33.17 (J/g), that is, the proportion ($H_{380}/H_{350-450}$) is calculated to be 78.7%.

In this embodiment, the absolute value of the heat quantity $H_{380}$ of the endothermic peak and the proportion ($H_{380}/H_{350-450}$) may be controlled, for example, changing the kind of the halogen element in the alkali metal element, the sulfur element and the halogen element constituting the sulfide-based solid electrolyte, using any other elements than the phosphorus element and others, controlling the blending ratio of these elements, selecting the raw materials to be used in production, controlling the blending ratio of the raw materials and selecting the solvent to be used.

In this embodiment, the alkali metal element includes lithium (Li), sodium (Na), potassium (K), rubidium (Rb), and cesium (Cs), and in consideration of the fact that when an alkali metal having a smaller molecular weight, the ion conductivity of the resultant sulfide-based solid electrolyte tends to increase, lithium (Li) or sodium (Na) is preferred, and lithium (Li) is more preferred.

One alone of these alkali metal elements may be used, or plural kinds thereof may be used in combination. In the case where plural kinds are combined from the viewpoint of increasing ion conductivity, a combination of lithium (Li) and sodium (Na) is preferred. In consideration of the fact that a light alkali metal tends to increase the ion conductivity of the resultant sulfide-based solid electrolyte, single use of lithium (Li) is especially preferred.

In this embodiment, the halogen element includes fluorine (F), chlorine (Cl), bromine (Br) and iodine (I), and above all, chlorine (Cl), bromine (Br) and iodine (I) are preferred, and bromine (Br) and iodine (I) are more preferred, and one alone thereof may be used singly or plural kinds thereof may be used in combination. Using the above as a halogen atom, the absolute value of the heat quantity $H_{380}$ of the endothermic peak may be readily made to be 10 (J/g) or more, and the proportion ($H_{380}/H_{350-450}$) may also be readily made to be 50% or more, that is, a sulfide-based solid electrolyte having a higher ion conductivity may be obtained. From the same viewpoint, combined use of bromine (Br) and iodine (I) is preferred.

In order to have a higher ion conductivity, the sulfide-based solid electrolyte of this embodiment preferably contains a phosphorus element in addition to the alkali metal element, the sulfur element and the halogen element.

In the case where the solid electrolyte contains an alkali metal element, a sulfur element, a phosphorus element and a halogen element in this embodiment, the blending ratio of these elements (by mol) is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), even more preferably (1.2 to 1.6)/(1.3 to 1.7)/(0.25 to 0.5)/(0.08 to 0.4). In the case where bromine and iodine are used in combination as halogen elements, the blending ratio (by mol) of the alkali metal element, the sulfur element, the phosphorus element, bromine and iodine is preferably (1.0 to 1.8)/(1.0 to 2.0)/(0.1 to 0.8)/(0.01 to 0.3)/(0.01 to 0.3), more preferably (1.1 to 1.7)/(1.2 to 1.8)/(0.2 to 0.6)/(0.05 to 0.25)/(0.05 to 0.25), even more preferably (1.2 to 1.6)/(1.3 to 1.7)/(0.25 to 0.5)/(0.07 to 0.2)/(0.07 to 0.2) and further more preferably (1.35 to 1.45)/(1.4 to 1.7)/(0.3 to 0.45)/(0.08 to 0.18)/(0.08 to 0.18). When the blending ratio (by mol) of the lithium element, the sulfur element, the phosphorus element and the halogen element falls within the above range, the absolute value of the heat quantity $H_{380}$ of the endothermic peak can be readily made to be 10 (J/g) or more, and the proportion ($H_{380}/H_{350-450}$) can also be readily made to be 50% or more, that is, a solid electrolyte having a higher lithium ion conductivity can be obtained.

The sulfide-based solid electrolyte of this embodiment may be any of an amorphous or crystalline one so far as it contains an alkali metal element, a phosphorus element and a halogen element and preferably further contains a sulfur element and has a specific exothermic peak in differential thermal analysis under a heating condition of 10° C./min.

An amorphous sulfide-based solid electrolyte has a high ion conductivity and can provide souped-up batteries.

The amorphous sulfide-based solid electrolyte of this embodiment contains an alkali metal element, a sulfur element, a phosphorus element and a halogen element, and typical examples thereof include a sulfide-based solid electrolyte formed of lithium sulfide, phosphorus sulfide and an alkali metal halide such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr; and a sulfide-based solid electrolyte further containing some other element such as an oxygen element and a silicon element, for example, $Li_2S$—$P_2S_5$—$Li_2O$—LiI, and $Li_2S$—$SiS_2$—$P_2S_5$—LiI. From the viewpoint of providing a higher ion conductivity, a sulfide-based solid electrolyte formed of lithium sulfide, phosphorus sulfide and an alkali metal halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr, is preferred.

The kind of the element constituting the amorphous sulfide-based solid electrolyte can be identified, for example, using an ICP emission spectrometer.

In the case where the sulfide-based solid electrolyte of this embodiment has at least $Li_2S$—$P_2S_5$, the molar ration of $Li_2S$ to $P_2S_5$ is, from the viewpoint of providing a higher ion conductivity, preferably (65 to 85)/(15 to 35), more preferably (70 to 80)/(20 to 30), even more preferably (72 to 78)/(22 to 28).

In the case where the sulfide-based solid electrolyte of this embodiment is, for example, $Li_2S$—$P_2S_5$—LiI—LiBr, the total content of lithium sulfide ($Li_2S$) and diphosphorus pentasulfide ($P_2S_5$) is preferably 60 to 100 mol %, more preferably 65 to 90 mol %, even more preferably 70 to 85 mol %. The ratio of lithium bromide (LiBr) to the total of lithium bromide (LiBr) and lithium iodide (LiI) is preferably 1 to 99 mol %, more preferably 20 to 90 mol %, even more preferably 40 to 80 mol %, and especially preferably 50 to 70 mol %.

The shape of the amorphous sulfide-based solid electrolyte is not specifically limited, and is, for example, granular. The mean particle size ($D_{50}$) of the granular amorphous sulfide-based solid electrolyte is, for example, within a range of 0.01 μm to 500 μm, or 0.1 to 200 μm.

More specifically, examples of the crystal structure of the crystalline sulfide-based solid electrolyte include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around 2θ=20.2° and 23.6° (for example, JP-2013-16423M.

In addition, there are further mentioned an $Li_{4-x}Ge_{1-x}P_xS_4$-based thio-LISICON Region II-type crystal structure (see Kanno, et al., Journal of The Electrochemical Society, 148 (7) A742-746 (2001)), and a crystal structure similar to the $Li_{4-x}Ge_{1-x}P_xS_4$-based thio-LISICON Region II-type crystal structure (see Solid State Ionics, 177 (2006), 2721-2725).

In X-ray diffractometry thereof a CuKα ray, the $Li_3PS_4$ crystal structure gives diffraction peaks, for example, at around 2θ=17.5°, 18.3°, 26.1°, 27.3°, 30.0°; the $Li_4P_2S_6$ crystal structure gives diffraction peaks, for example, at around 2θ=16.9°, 27.1°, 32.5°; the $Li_7PS_6$ crystal structure gives diffraction peaks, for example, at around 2θ=15.3°, 25.2°, 29.6°, 31.0°; the $Li_7P_3S_{11}$ crystal structure gives diffraction peaks, for example, at around 2θ=17.8°, 18.5°, 19.7°, 21.8°, 23.7°, 25.9°, 29.6°, 30.0°; the $Li_{4-x}Ge_{1-x}P_xS_4$-based thio-LISICON Region II-type crystal structure gives diffraction peaks, for example, at around 2θ=20.1°, 23.9°, 29.5°; and the crystal structure similar to the $Li_{4-x}Ge_{1-x}P_xS_4$-based thio-LISICON Region II-type crystal structure gives diffraction peaks, for example, at around 2θ=20.2, 23.6°. The position of these peaks may vary within a range of ±0.5°.

The crystal structure of the crystalline sulfide-based solid electrolyte also includes an argyrodite-type crystal structure. Examples of the argyrodite-type crystal structure include an $Li_7PS_6$ crystal structure; a crystal structure represented by a compositional formula $Li_{7-x}P_{1-y}Si_yS_6$ or $Li_{7+x}P_{1-y}Si_yS_6$ (x is −0.6 to 0.6, y is 0.1 to 0.6) which has a structure of $Li_7PS_6$ and in which a part of P is substituted with Si; a crystal structure represented by $Li_{7-x-2y}PS_{6-x-y}Cl_x$ (0.8≤x≤1.7, 0<y≤−0.25x+0.5); a crystal structure represented by $Li_{7-x}PS_{6-x}Ha_x$ (Ha represents Cl or Br, x is preferably 0.2 to 1.8).

The crystal structure represented by a compositional formula $Li_{7-x}P_{1-y}Si_yS_6$ or $Li_{7+x}P_{1-y}Si_yS_6$ (x is −0.6 to 0.6, y is 0.1 to 0.6), which has the above-mentioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the above-mentioned compositional formula $Li_{7-x-2y}PS_{6-x-y}Cl_x$ (0.8≤x≤1.7, 0<y≤−0.25x+0.5) is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the compositional formula $Li_{7-x}PS_{6-x}Ha_x$ (Ha represents Cl or Br, x is preferably 0.2 to 1.8) is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

These peak positions may vary within a range of ±0.5°.

The shape of the crystalline sulfide-based solid electrolyte is not specifically limited, and is, for example, granular. The mean particle size ($D_{50}$) of the granular crystalline sulfide-based solid electrolyte is, for example, within a range of 0.01 μm to 500 μm, or 0.1 to 200 μm.

[Production Method]

The sulfide-based solid electrolyte of this embodiment may be produced in any known method with no specific limitation thereto, so far as the resultant solid electrolyte contains a lithium element, a sulfur element, a phosphorus element and a halogen element and has a specific endothermic peak in differential heat analysis under a heating condition of 10° C./min, but in consideration of the fact that the resultant solid electrolyte could readily have the specific endothermic peak and could have a higher ion conductivity, it is desirable that the solid electrolyte is produced according to the production method for a sulfide-based solid electrolyte of this embodiment mentioned above, that is, according to the production method for a sulfide-based solid electrolyte where an alkali metal sulfide and a substance represented by the formula (1) are reacted in a solvent, or an alkali metal sulfide, a substance represented by the formula (1) and a phosphorus compound are reacted in a solvent:

$$X_2 \quad (1)$$

wherein X represents a halogen element.

In the case where the sulfide-based solid electrolyte of this embodiment is produced, the absolute value of the heat quantity $H_{380}$ of the endothermic peak and the proportion ($H_{380}/H_{350-450}$) are controlled by controlling the condition of the raw materials to be used, the blending ratio thereof and the solvent to be used, as mentioned above.

The raw materials to be used and the blending ratio thereof are the same as the raw materials and the blending ratio thereof described in the section of the production method for the sulfide-based solid electrolyte of this embodiment mentioned hereinabove.

The solvent to be used may be the same as the solvent described for the production method of the sulfide-based solid electrolyte of this embodiment as above, and in consideration of attaining the specific endothermic peak with ease and attaining a higher ion conductivity, an aromatic hydrocarbon solvent or a solvent having an electrophilic group is preferred. From the same viewpoint, as the aromatic hydrocarbon solvent, toluene, xylene, ethylbenzene and chlorobenzene are preferred, toluene and chlorobenzene are more preferred, and chlorobenzene is even more preferred. In the case where bromine ($Br_2$) is used as the substance $X_2$, a solvent having an electrophilic group is preferred as facilitating the reaction of bromine ($Br_2$) with the other raw material. Preferred examples of the solvent having an electrophilic group include chlorobenzene, tert-butylbenzene, trifluoromethylbenzene, and nitrobenzene, and above all, chlorobenzene is preferred.

The sulfide-based solid electrolyte of this embodiment has a high ion conductivity and has excellent battery performance, and is therefore favorably used for batteries. Use of a lithium element as the conductor species is especially preferred. The sulfide-based solid electrolyte of this embodiment may be used as a positive electrode layer or a negative electrode layer, or may also be used as an electrolyte layer. Each layer may be produced according to a known method.

Preferably, the battery has a collector in addition to the positive electrode layer, the electrolyte layer and the negative electrode layer, and the collector may be any known one. For example, a layer of Au, Pt, Al, Ti, or a layer formed by coating one reactive with the sulfide-based solid electrolyte, such as Cu, with Au or the like may be used.

EXAMPLES

Next, the present invention is described specifically with reference to Examples, but the present invention is not whatsoever restricted by these Examples.

Example 1A

A planetary ball mill (trade name: Classic Line P-7, manufactured by Fritsch Japan Co., Ltd.) was set up. 0.598 g of lithium sulfide, 0.867 g of diphosphorus pentasulfide, 0.271 g of lithium bromide, and 0.264 g of iodine were weighed, put into a container (45 cc, made of zirconia) for the planetary ball mill, and further 4 g of dewatered toluene (water content: 10 ppm or less) was put thereinto, and the container was completely sealed up. This container was set in the planetary ball mill, and driven for simultaneous mixing, stirring and grinding at a table rotation number of 500 rpm for 40 hours to prepare a sulfide-based solid electrolyte.

5 ml of dewatered toluene was added to the product containing the resultant, amorphous sulfide-based solid electrolyte and the solvent, in a glove box, and collected in a metal vat, and after a powder (solid electrolyte) precipitated, the supernatant solvent was removed. Next, the precipitated powder was put on a hot plate and dried at 80° C. to give a powdery amorphous sulfide-based solid electrolyte. The resultant, powdery amorphous sulfide-based solid electrolyte was analyzed through powdery X-ray diffraction (XRD) using an X-ray diffractometer (XRD) (Smart Lab Apparatus, manufactured by Rigaku Corporation). Any other peak than the peaks derived from the raw materials was detected. The X-ray diffraction spectrum is shown in FIG. 1.

The resultant powdery amorphous sulfide-based solid electrolyte was heated on a hot plate set in a glove box, at 203° C. for 3 hours.

Figure 2:
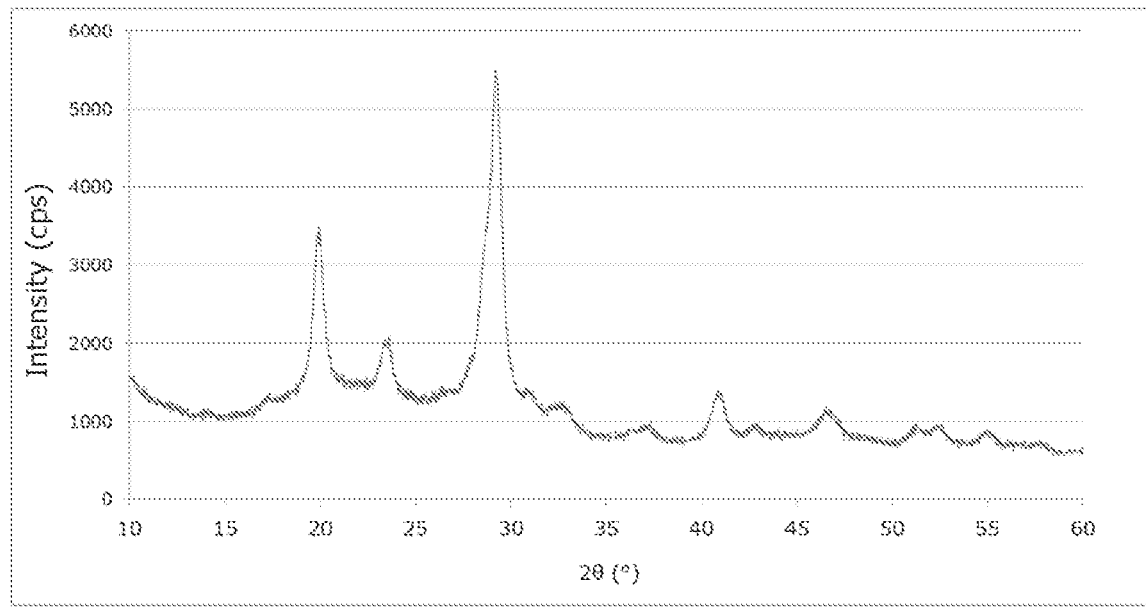
FIG. 2 is an X-ray analysis spectrum of the crystalline sulfide-based solid electrolyte obtained in Example 1A.

The heated powder was analyzed through powdery X-ray diffraction (XRD) using an X-ray diffractometer (XRD) (Smart Lab Apparatus, manufactured by Rigaku Corporation). The X-ray diffraction spectrum is shown in FIG. 2. As shown in FIG. 2, crystallization peaks were detected at $2\theta=19.9°$, $23.6°$, which confirmed formation of a crystalline sulfide-based solid electrolyte.

(Measurement of Solubility of Substance $X_2$)

Iodine (2 g) was added to 3 mL of a solvent, and stirred at room temperature (25° C.) or 20 minutes. A solid iodine residue was confirmed visually. 0.1 g of the supernatant was weighed, and 1 g of an aqueous sodium thiosulfate solution (10% by mass, $Na_2S_2O_3$) was added to the supernatant, and shaken for about 1 minute to confirm disappearance of the color of the solution. The iodine concentration of the solution was quantified through ICP emission spectrometric analysis (high-frequency inductively-coupled plasma emission spectrometry) to calculate the solubility of iodine, which was 15.0% by mass.

(Measurement of Ion Conductivity)

The resultant crystalline sulfide-based solid electrolyte was molded to give circular pellets each having a diameter of 10 mm (cross section S: 0.785 $cm^2$) and a height (L) of 0.1 to 0.3 cm to be samples. Electrode terminals were led from top and bottom of each sample to measure the ion conductivity of the sample according to an AC impedance method at 25° C. (frequency range: 5 MHz to 0.5 Hz, amplitude: 10 mV) to draw a Cole-Cole plot. At around the right end of the arc observed in the high-frequency side region, the real number part Z' ($\Omega$) at the point at which –Z" ($\Omega$) is the smallest is referred to as the bulk resistance R ($\Omega$) of the electrolyte, and the ion conductivity σ (S/cm) was calculated according to the following equation.

$R=\rho(L/S)$ $\sigma=1/\rho$

As a result of measurement, the ion conductivity of the crystalline sulfide-based solid electrolyte was $4.84\times10^{-3}$ (S/cm), and the electrolyte was confirmed to have a high ion conductivity. The condition and the ion conductivity in Example 1A are shown in Table 1.

Example 2A

A sulfide-based solid electrolyte was produced using the apparatus shown in FIG. 3. The apparatus shown in FIG. 3 is described. The apparatus shown in FIG. 3 is provided with a bead mill 10 where raw materials are mixed, stirred and ground or processed through treatment of these as combined, and a reactor 20. The reactor 20 is provided with a container 22 and a stirrer 24, and the stirrer 24 is driven by a motor (M).

The bead mill 10 is equipped with a heater 30 around the mill 10, in which hot water (HW) may run through, and the hot water (HW) supplies heat via the heater 30. The hot water (RHW) discharged out through the outlet of the heater 30 is, after heated, externally circulated into the heater 30 as hot water (HW). The reactor 20 is put in an oil bath 40. The oil bath 40 heats the raw materials and the solvent in the container 22 up to a predetermined temperature. A condenser pipe 26 for cooling and liquefying the vaporized solvent is attached to the reactor 20, and the cooling water (CW) cools the solvent in the condenser pipe 26. The cooling water (RCW) discharged out through the outlet of the condenser pipe 26 is, after cooled, externally circulated into the condenser pipe 26 as cooling water (CW).

The bead mill 10 and the reactor 20 are connected via a first connecting pipe line 50 and a second connecting pipe line 52. The first connecting pipe line 50 transfers the raw materials and the solvent in the bead mill 10 toward the reactor 20, and the second connecting pipe line 52 transfers the raw materials and the solvent in the reactor 20 toward the bead mill 10. Since the raw materials and others are circulated via the connecting pipe lines 50 and 52, a pump 54 (for example, a diaphragm pump) is arranged in the second connecting pipe line 52. A thermometer (Th) is arranged in the reactor 20 and in the course of ejection from the pump 54 for constant temperature control.

In this Example, as a bead mill, "Bead Mill LMZ015" (manufactured by Ashizawa Finetech Ltd.) was used, and 485 g of zirconia balls each having a diameter of 0.5 mm were put thereinto. As a reactor, a 2.0-liter glass reactor equipped with a stirrer was used.

34.77 g of lithium sulfide and 45.87 g of diphosphorus pentasulfide were put into the reactor 20, and 1,000 ml of dewatered toluene was added thereto to give a slurry. The slurry in the reactor 20 was circulated at a flow rate of 600 ml/min using the pump 54, and the bead mill 10 was started to be driven at a peripheral speed of 10 m/s. Subsequently 13.97 g of iodine (Wako Pure Chemical Corporation, special grade) and 13.19 g of bromine (Wako Pure Chemical Corporation, special grade) dissolved in 200 ml of dewatered toluene were put into the reactor 20.

After addition of iodine and bromine, the peripheral speed of the bead mill was changed to 12 m/s, and hot water (HW) was applied thereto in a mode of external circulation, and the reaction was carried out in such a manner that the ejection temperature of the pump 54 could be kept at 70° C. After the supernatant of the resultant slurry was removed, the residue was put on a hot plate, and dried thereon at 80° C. to give a powdery amorphous sulfide-based solid electrolyte. The resultant sulfide-based solid electrolyte was analyzed through powdery X-ray diffractometry (XRD) in the same manner as in Example 1A, and any other peak than the peaks derived from the raw materials was not detected.

The resultant, powdery amorphous sulfide-based solid electrolyte was heated at 195° C. for 3 hours using a hot plate set in a glove box, thereby giving a crystalline sulfide-based solid electrolyte. In powdery X-ray diffractometry (XRD) of the product, crystallization peaks were detected at $2\theta=19.9°$, $23.6°$ like in Example 1, which confirmed production of a crystalline sulfide-based solid electrolyte. The ion conductivity of the resultant crystalline sulfide-based solid electrolyte was measured according to the above (for measurement of ion conductivity), and was $5.55 \times 10^{-3}$ (S/cm), which confirmed that the solid electrolyte has a high ion conductivity. The condition and the ion conductivity in Example 2A are shown in Table 1.

Example 3A

An amorphous sulfide-based solid electrolyte was produced in the same manner as in Example 2A, except that in Example 2A, 35.64 g of lithium sulfide, 49.25 g of diphosphorus pentasulfide, 14.06 g of iodine and 8.85 g of bromine were used. The resultant sulfide-based solid electrolyte was analyzed through powdery X-ray diffractometry in the same manner as in Example 1A, which confirmed absence of any other peak than the peaks derived from the raw materials.

The resultant amorphous sulfide-based solid electrolyte was heated at 203° C. for 3 hours to give a crystalline sulfide-based solid electrolyte. In powdery X-ray diffractometry (XRD) of the product, crystallization peaks were detected at $2\theta=19.9°$, $23.6°$ like in Example 1, which confirmed production of a crystalline sulfide-based solid electrolyte. The ion conductivity of the resultant crystalline sulfide-based solid electrolyte was measured, and was $5.01 \times 10^{-3}$ (S/cm), which confirmed that the solid electrolyte has a high ion conductivity. The condition and the ion conductivity in Example 3A are shown in Table 1.

Example 4A

A sulfide-based solid electrolyte was produced in the same manner as in Example 1A, except that in Example 1A, 0.645 g of lithium sulfide, 0.851 g of diphosphorus pentasulfide, 0.245 g of bromine, and 0.259 g of iodine were used, and the solvent was changed from dewatered toluene to dewatered ethylbenzene (water content: 10 ppm or less). 20 ml of dewatered toluene was added to the resultant slurry product containing the sulfide-based solid electrolyte and the solvent, and collected in a 50-ml Schlenk bottle, and after powder precipitation, the supernatant solvent was removed. This operation was repeated further twice, and then while heated at 100° C. in an oil bath, this was dried under reduced pressure using a vacuum pump to give an amorphous sulfide-based solid electrolyte. The resultant sulfide-based solid electrolyte was analyzed through powdery X-ray diffractometry (XRD) in the same manner as in Example 1A, which confirmed absence of any other peak than the peaks derived from the raw materials.

The resultant amorphous sulfide-based solid electrolyte was heated at 180° C. for 3 hours to give a crystalline sulfide-based solid electrolyte. In powdery X-ray diffractometry (XRD) of the product, crystallization peaks were detected at $2\theta=19.9°$, $23.6°$ like in Example 1, which confirmed production of a crystalline sulfide-based solid electrolyte. The ion conductivity of the resultant crystalline sulfide-based solid electrolyte was measured, and was $5.27 \times 10^{-3}$ (S/cm), which confirmed that the solid electrolyte has a high ion conductivity. The condition and the ion conductivity in Example 4A are shown in Table 1.

Example 5A

An amorphous sulfide-based solid electrolyte was produced in the same manner as in Example 4A, except that in Example 4A, the solvent was changed from dewatered ethylbenzene to dewatered xylene (water content: 10 ppm or less). The resultant sulfide-based solid electrolyte was analyzed through powdery X-ray diffractometry (XRD) in the same manner as in Example 1A, which confirmed absence of any other peak than the peaks derived from the raw materials.

The resultant amorphous sulfide-based solid electrolyte was heated at 188° C. for 3 hours to give a crystalline sulfide-based solid electrolyte. In powdery X-ray diffractometry (XRD) of the product, crystallization peaks were detected at $2\theta=19.9°$, $23.6°$ like in Example 1, which confirmed production of a crystalline sulfide-based solid electrolyte. The ion conductivity of the resultant crystalline sulfide-based solid electrolyte was measured, and was $5.29 \times 10^{-3}$ (S/cm), which confirmed that the solid electrolyte has a high ion conductivity. The condition and the ion conductivity in Example 5A are shown in Table 1.

Comparative Example 1A

An amorphous sulfide-based solid electrolyte was produced in the same manner as in Example 2A, except that in Example 2A, 29.66 g of lithium sulfide and 47.83 g of diphosphorus pentasulfide were used, and in place of 13.97 g of iodine (Wako Pure Chemical Corporation, special grade) and 13.19 g of bromine (Wako Pure Chemical Corporation, special grade) dissolved in 200 ml of toluene, 14.95 g of lithium bromide, 15.36 g of lithium iodide and 1200 ml of dewatered toluene were put into the reactor 20. The resultant sulfide-based solid electrolyte was analyzed through powdery X-ray diffractometry (XRD) in the same manner as in Example 1A, in which any other peak than the peaks derived from the raw materials was not detected, and which confirmed that the product was an amorphous sulfide-based solid electrolyte.

The resultant amorphous sulfide-based solid electrolyte was heated at 203° C. for 3 hours to give a crystalline sulfide-based solid electrolyte. In powdery X-ray diffractometry (XRD) of the product, crystallization peaks were detected at $2\theta=19.9°$, $23.6°$ like in Example 1, which confirmed production of a crystalline sulfide-based solid electrolyte. The ion conductivity of the resultant crystalline sulfide-based solid electrolyte was measured, and was $4.76 \times 10^{-3}$ (S/cm), which confirmed that the ion conductivity thereof was not so high like that of the ion conductivity of the crystalline sulfide-based solid electrolytes of Examples 1A to 5A. The condition and the ion conductivity in Comparative Example 1A are shown in Table 1.

Comparative Example 2A

An amorphous sulfide-based solid electrolyte was produced in the same manner as in Example 2A, except that in Example 2A, 31.58 g of lithium sulfide and 50.93 g of diphosphorus pentasulfide were used, and in place of 13.97 g of iodine (Wako Pure Chemical Corporation, special grade) and 13.19 g of bromine (Wako Pure Chemical Corporation, special grade) dissolved in 200 ml of toluene, 9.95 g of lithium bromide, 15.33 g of lithium iodide and 1200 ml of dewatered toluene were put into the reactor 20. The resultant sulfide-based solid electrolyte was analyzed through powdery X-ray diffractometry (XRD) in the same manner as in Example 1A, in which any other peak than the peaks derived from the raw materials was not detected, and which confirmed that the product was an amorphous sulfide-based solid electrolyte.

The resultant amorphous sulfide-based solid electrolyte was heated at 203° C. for 3 hours to give a crystalline sulfide-based solid electrolyte. In powdery X-ray diffractometry (XRD) of the product, crystallization peaks were detected at 2θ=19.9°, 23.6° like in Example 1, which confirmed production of a crystalline sulfide-based solid electrolyte. The ion conductivity of the resultant crystalline sulfide-based solid electrolyte was measured, and was 4.36×10$^{-3}$ (S/cm), which confirmed that the ion conductivity thereof was not so high like that of the ion conductivity of the crystalline sulfide-based solid electrolytes of Examples 1A to 5A. The condition and the ion conductivity in Comparative Example 2A are shown in Table 1.

TABLE 1

| | Grinding Machine | Solvent | Blending Ratio of Raw Materials (by mol)*1 | Halogen Compound 1 | Halogen Compound 2 | Lithium Sulfide Molar Number Proportion*2 | Substance X$_2$ Content*3 | Ion Conductivity S/cm |
|---|---|---|---|---|---|---|---|---|
| Example 1A | ball mill | toluene | 61.25:18.75:5.0:15.0 | iodine | lithium bromide | 75 | 4.25 | 4.84 × 10$^{-3}$ |
| Example 2A | bead mill | toluene | 68.75:18.75:5.0:7.5 | iodine | bromine | 75 | 12.5 | 5.55 × 10$^{-3}$ |
| Example 3A | bead mill | toluene | 70:20:5:5 | iodine | bromine | 75 | 10.0 | 5.01 × 10$^{-3}$ |
| Example 4A | ball mill | ethylbenzene | 68.75:18.75:5.0:7.5 | iodine | bromine | 75 | 12.5 | 5.27 × 10$^{-3}$ |
| Example 5A | ball mill | xylene | 68.75:18.75:5.0:7.5 | iodine | bromine | 75 | 12.5 | 5.29 × 10$^{-3}$ |
| Comparative Example 1A | bead mill | toluene | 56.25:18.75:10.0:15.0 | lithium iodide | lithium bromide | 75 | 0 | 4.76 × 10$^{-3}$ |
| Comparative Example 2A | bead mill | toluene | 60:20:10:10 | lithium iodide | lithium bromide | 75 | 0 | 4.36 × 10$^{-3}$ |

*1This is a blending ratio (by mol) of the raw materials of lithium sulfide, diphosphorus pentasulfide, halogen compound 1 and halogen compound 2.
*2This is a ratio of the molar number of lithium sulfide (Li$_2$S) excluding lithium sulfide (Li$_2$S) of the same molar number as the molar number of the substance X$_2$, to the total molar number of lithium sulfide (Li$_2$S) and diphosphorus pentasulfide (P$_2$S$_5$) excluding lithium sulfide (Li$_2$S) of the same molar number as the molar number of the substance X$_2$.
*3This is a content (mol %) of the substance X$_2$ relative to the total amount of alkali metal sulfide, phosphorus compound and substance X$_2$.

Examples 1A to 5A confirmed that, according to the production method for a solid electrolyte of this embodiment, sulfide-based solid electrolytes having a high ion conductivity and excellent in battery performance can be obtained with ease. More specifically, comparison between Example 2A and Comparative Example 1A and comparison between Example 3A and Comparative Example 2A confirmed that, even when the same elements are used, the sulfide-based solid electrolytes produced according to the production method of this embodiment have a higher ion conductivity.

Example 1B

An amorphous sulfide-based solid electrolyte (80 (0.75 Li$_2$S/0.25 P$_2$S$_5$)/10 LiBr/10 LiI, Li:S:P:Br:I (by mol)=1.400: 1.600:0.400:0.100:0.100) was produced in the same manner as in Example 1A except that in Example 1A, 0.661 g of lithium sulfide, 0.914 g of diphosphorus pentasulfide, 0.164 g of bromine in place of lithium bromide, and 0.261 g of iodine were used. The resultant sulfide-based solid electrolyte was analyzed through powdery X-ray diffractometry (XRD) in the same manner as in Example 1A, which confirmed absence of any other peak than the peaks derived from the raw materials. As a result of composition analysis using an ICP emission spectrometer, Li:S:P:Br:I (by mol) =1.391:1.603:0.404:0.100:0.105.

The resultant, powdery amorphous sulfide-based solid electrolyte was heated at 203° C. for 3 hours using a hot plate set in a glove box, thereby giving a crystalline sulfide-based solid electrolyte. In powdery X-ray diffractometry (XRD) of the product, crystallization peaks were detected at 2θ=19.9°, 23.6° like in Example 1A, which confirmed production of a crystalline sulfide-based solid electrolyte. The ion conductivity of the resultant crystalline sulfide-based solid electrolyte was measured according to the above (for measurement of ion conductivity), and was 5.20×10$^{-3}$ (S/cm), which confirmed that the solid electrolyte has a high ion conductivity.

Figure 6:
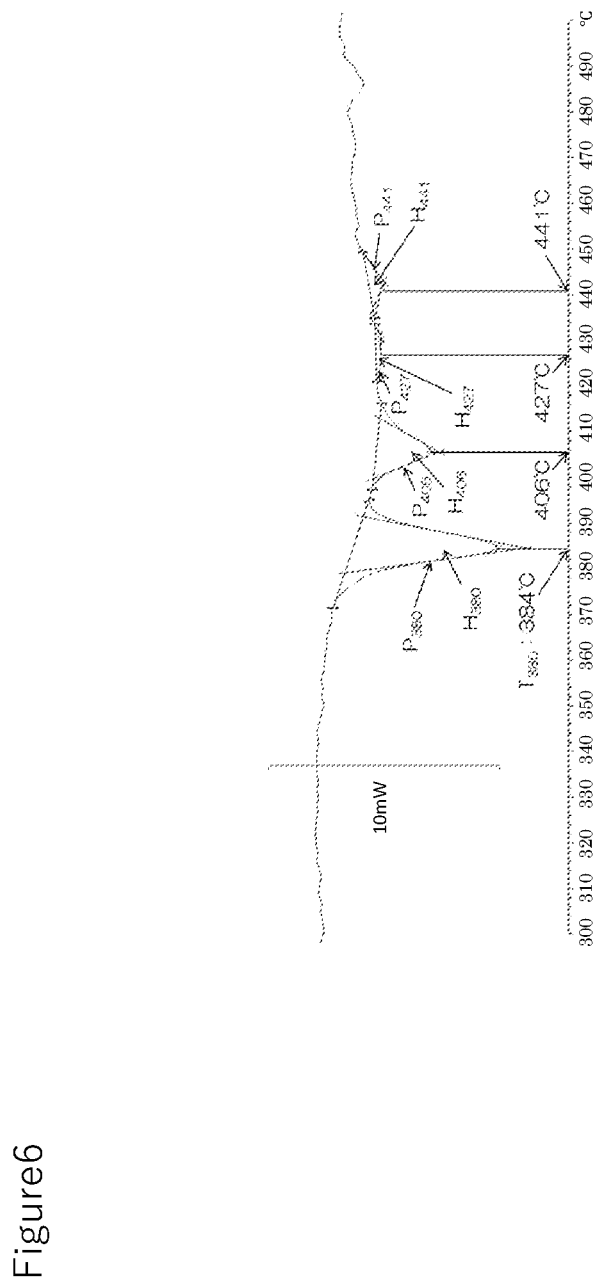
FIG. 6 is a DTA chart up to 300 to 500° C. in differential thermal analysis of the solid electrolyte obtained in Example 1B.

The resultant amorphous sulfide-based solid electrolyte was subjected to differential thermal analysis (DTA) under a heating condition of 10° C./min from room temperature up to 500° C. in a nitrogen gas atmosphere, using a differential thermal analyzer (DTA) (thermogravimetric analyzer "TGA/DSC1 (model number)", STAR$^e$ software, all manufactured by METTLER TOLEDO Corporation). FIG. 6 shows the differential thermal analysis chart (DTA chart). As in FIG. 6, an endothermic peak (P$_{380}$) having a peak top at 384° C. at 380±15° C., an endothermic peak (P$_{406}$) having a peak top at 406° C., an endothermic peak (P$_{427}$) having a peak top at 427° C., and an endothermic peak (P$_{441}$) having a peak top at 441° C. were detected, and the absolute value of the heat quantity at each endothermic peak is H$_{380}$ of 15.18 (J/g), H$_{406}$ of 5.72 (J/g), H$_{427}$ of 0.63 (J/g), H$_{441}$ of 1.37 (J/g), and the ratio (H$_{380}$/H$_{350-450}$) is 66.3%. The condition, the heat quantity at each endothermic peak and the ion conductivity in Example 1B are shown in Table 2.

Example 2B

An amorphous sulfide-based solid electrolyte (75 (0.75 Li$_2$S/0.25 P$_2$S$_5$)/15 LiBr/10 LiI, Li:S:P:Br:I (by mol)=1.375: 1.500:0.375:0.150:0.100) was produced in the same manner as in Example 1B except that in Example 1B, 0.645 g of lithium sulfide, 0.851 g of diphosphorus pentasulfide, 0.245 g of bromine and 0.259 of iodine were used. The resultant sulfide-based solid electrolyte was analyzed through powdery X-ray diffractometry (XRD) in the same manner as in Example 1A, which confirmed absence of any other peak than the peaks derived from the raw materials. As a result of composition analysis using an ICP emission spectrometer, Li:S:P:Br:I (by mol)=1.358:1.503:0.382:0.157:0.105.

The resultant, powdery amorphous sulfide-based solid electrolyte was heated at 188° C. for 3 hours using a hot plate set in a glove box, thereby giving a crystalline sulfide-based solid electrolyte. In powdery X-ray diffractometry (XRD) of the product, crystallization peaks were detected at 2θ=19.9°, 23.6° like in Example 1A, which confirmed production of a crystalline sulfide-based solid electrolyte. The ion conductivity of the resultant crystalline sulfide-based solid electrolyte was measured according to the above (for measurement of ion conductivity), and was 5.41×10$^{-3}$ (S/cm), which confirmed that the solid electrolyte has a high ion conductivity.

The resultant amorphous sulfide-based solid electrolyte was subjected to differential thermal analysis (DTA) under a heating condition of 10° C./min from room temperature up to 500° C. in a nitrogen gas atmosphere in the same manner as in Example 1B. FIG. 5 shows the differential thermal analysis chart (DTA chart). As in FIG. 5, an endothermic peak ($P_{380}$) having a peak top at 387° C. at 380±15° C., an endothermic peak ($P_{406}$) having a peak top at 404° C., and an endothermic peak ($P_{422}$) having a peak top at 422° C. were detected, and the absolute value of the heat quantity at each endothermic peak is $H_{380}$ of 26.12 (J/g), $H_{404}$ of 6.83 (J/g), $H_{422}$ of 0.22 (J/g), and the ratio ($H_{380}/H_{350-450}$) is 78.7%. The condition, the heat quantity at each endothermic peak and the ion conductivity in Example 2B are shown in Table 2.

Example 3B

A sulfide-based solid electrolyte was produced in the same manner as in Example 1B, except that in Example 1B, the solvent was changed from dewatered toluene to dewatered chlorobenzene (water content: 10 ppm or less). 20 ml of dewatered chlorobenzene was added to the resultant slurry product containing the sulfide-based solid electrolyte and the solvent, and collected in a 50-ml Schlenk bottle, and after powder precipitation, the supernatant solvent was removed. Subsequently, while heated at 100° C. in an oil bath, this was dried under reduced pressure using a vacuum pump to give an amorphous sulfide-based solid electrolyte (80 (0.75 $Li_2S$/0.25 $P_2S_5$)/10 LiBr/10 LiI, Li:S:P:Br:I (by mol)=1.400:1.600:0.400:0.100:0.100). The resultant sulfide-based solid electrolyte was analyzed through powdery X-ray diffractometry (XRD) in the same manner as in Example 1A, which confirmed absence of any other peak than the peaks derived from the raw materials. As a result of composition analysis using an ICP emission spectrometer, Li:S:P:Br:I (by mol)=1.390:1.590:0.400:0.109:0.101.

The resultant, powdery amorphous sulfide-based solid electrolyte was heated at 188° C. for 3 hours using a hot plate set in a glove box, thereby giving a crystalline sulfide-based solid electrolyte. In powdery X-ray diffractometry (XRD) of the product, crystallization peaks were detected at 2θ=19.9°, 23.6° like in Example 1, which confirmed production of a crystalline sulfide-based solid electrolyte. The ion conductivity of the resultant crystalline sulfide-based solid electrolyte was measured according to the above (for measurement of ion conductivity), and was $5.74 \times 10^{-3}$ (S/cm), which confirmed that the solid electrolyte has a high ion conductivity.

Figure 7:
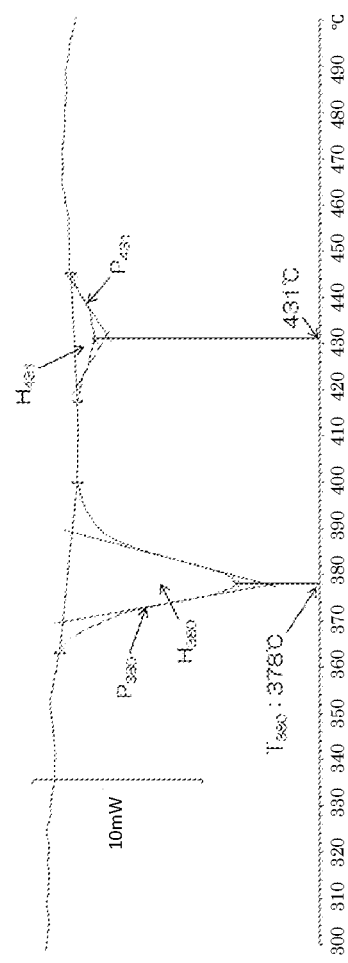
FIG. 7 is a DTA chart up to 300 to 500° C. in differential thermal analysis of the solid electrolyte obtained in Example 3B.

The resultant amorphous sulfide-based solid electrolyte was subjected to differential thermal analysis (DTA) under a heating condition of 10° C./min from room temperature up to 500° C. in a nitrogen gas atmosphere in the same manner as in Example 1B. FIG. 7 shows the differential thermal analysis chart (DTA chart). As in FIG. 7, an endothermic peak ($P_{380}$) having a peak top at 378° C. at 380±15° C., and an endothermic peak ($P_{431}$) having a peak top at 431° C. were detected, and the absolute value of the heat quantity at each endothermic peak is $H_{380}$ of 34.03 (J/g), and $H_{431}$ of 4.82 (J/g), and the ratio ($H_{380}/H_{350-450}$) is 87.6%. The condition, the heat quantity at each endothermic peak and the ion conductivity in Example 3B are shown in Table 2.

Example 4B

An amorphous sulfide-based solid electrolyte (75 (0.75 $Li_2S$/0.25 $P_2S_5$)/15 LiBr/10 LiI, Li:S:P:Br:I (by mol)=1.375:1.500:0.375:0.150:0.100) was produced in the same manner as in Example 3B except that in Example 3B, 0.645 g of lithium iodide, 0.851 g of diphosphorus pentasulfide, 0.245 g of bromine and 0.259 g of iodine were used. The resultant sulfide-based solid electrolyte was analyzed through powdery X-ray diffractometry (XRD) in the same manner as in Example 1A, which confirmed absence of any other peak than the peaks derived from the raw materials. As a result of composition analysis using an ICP emission spectrometer, Li:S:P:Br:I (by mol)=1.358:1.480:0.374:0.166:0.102.

The resultant, powdery amorphous sulfide-based solid electrolyte was heated at 188° C. for 3 hours using a hot plate set in a glove box, thereby giving a crystalline sulfide-based solid electrolyte. In powdery X-ray diffractometry (XRD) of the product, crystallization peaks were detected at 2θ=19.9°, 23.6° like in Example 1, which confirmed production of a crystalline sulfide-based solid electrolyte. The ion conductivity of the resultant crystalline sulfide-based solid electrolyte was measured according to the above (for measurement of ion conductivity), and was $6.09 \times 10^{-3}$ (S/cm), which confirmed that the solid electrolyte has a high ion conductivity.

Figure 8:
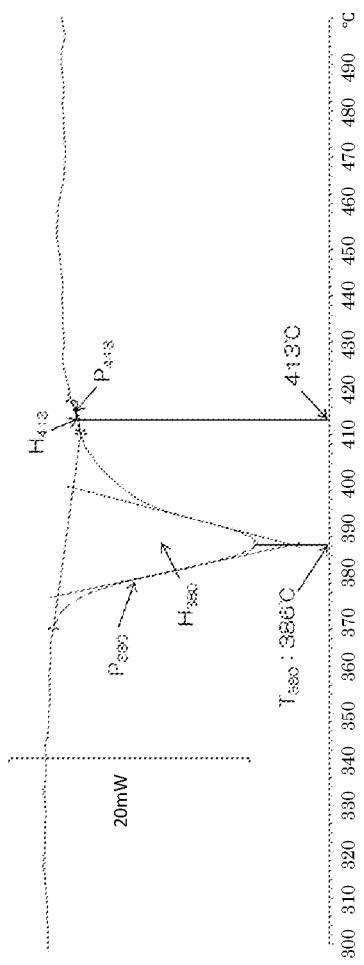
FIG. 8 is a DTA chart up to 300 to 500° C. in differential thermal analysis of the solid electrolyte obtained in Example 4B.

The resultant amorphous sulfide-based solid electrolyte was subjected to differential thermal analysis (DTA) under a heating condition of 10° C./min from room temperature up to 500° C. in a nitrogen gas atmosphere in the same manner as in Example 1B. FIG. 8 shows the differential thermal analysis chart (DTA chart). As in FIG. 8, an endothermic peak ($P_{380}$) having a peak top at 386° C. at 380±15° C., and an endothermic peak ($P_{413}$) having a peak top at 413° C. were detected, and the absolute value of the heat quantity at each endothermic peak is $H_{380}$ of 48.35 (J/g), and $H_{413}$ of 0.13 (J/g), and the ratio ($H_{380}/H_{350-450}$) is 99.7%. The condition, the heat quantity at each endothermic peak and the ion conductivity in Example 4B are shown in Table 2.

Example 5B

In the same manner as in Example 2A, an amorphous sulfide-based solid electrolyte (75 (0.75 $Li_2S$/0.25 $P_2S_5$)/15 LiBr/10 LiI, Li:S:P:Br:I (by mol)=1.375:1.500:0.375:0.150: 0.100) was produced. The resultant sulfide-based solid electrolyte was analyzed through powdery X-ray diffractometry (XRD) in the same manner as in Example 1A, which confirmed absence of any other peak than the peaks derived from the raw materials. As a result of composition analysis using an ICP emission spectrometer, Li:S:P:Br:I (by mol)=1.364:1.499:0.378:0.153:0.103.

The resultant, powdery amorphous sulfide-based solid electrolyte was heated at 195° C. for 3 hours using a hot plate set in a glove box, thereby giving a crystalline sulfide-based solid electrolyte. In powdery X-ray diffractometry (XRD) of the product, crystallization peaks were detected at 2θ=19.9°, 23.6° like in Example 1, which confirmed production of a crystalline sulfide-based solid electrolyte. The ion conductivity of the resultant crystalline sulfide-based solid electrolyte was measured according to the above (for measurement of ion conductivity), and was $5.55 \times 10^{-3}$ (S/cm), which confirmed that the solid electrolyte has a high ion conductivity.

Figure 9:
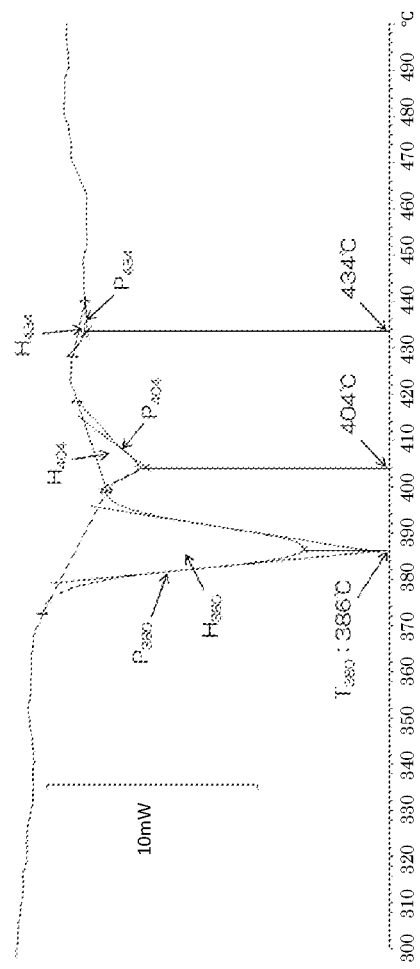
FIG. 9 is a DTA chart up to 300 to 500° C. in differential thermal analysis of the solid electrolyte obtained in Example 5B.

The resultant amorphous sulfide-based solid electrolyte was subjected to differential thermal analysis (DTA) under a heating condition of 10° C./min from room temperature up to 500° C. in a nitrogen gas atmosphere in the same manner as in Example 1B. FIG. 9 shows the differential thermal analysis chart (DTA chart). As in FIG. 9, an endothermic peak ($P_{380}$) having a peak top at 386° C. at 380±15° C., an endothermic peak ($P_{404}$) having a peak top at 404° C. and an endothermic peak ($P_{434}$) having a peak top at 434° C. were detected, and the absolute value of the heat quantity at each endothermic peak is $H_{380}$ of 33.72 (J/g), $H_{404}$ of 5.42 (J/g), and $H_{434}$ of 0.60 (J/g), and the ratio ($H_{380}/H_{350-450}$) is 84.9%. The condition, the heat quantity at each endothermic peak and the ion conductivity in Example 5B are shown in Table 2.

Example 6B

A sulfide-based solid electrolyte was produced in the same manner as in Example 5B, except that in Example 5B, the solvent was changed from dewatered toluene to dewatered chlorobenzene (water content: 10 ppm or less). 50 ml of the resultant slurry product containing the sulfide-based solid electrolyte and the solvent was collected in a 100-ml Schlenk bottle, and after powder precipitation, the supernatant solvent was removed. Subsequently, while heated at 100° C. in an oil bath, this was dried under reduced pressure using a vacuum pump to give an amorphous sulfide-based solid electrolyte (75 (0.75 $Li_2S$/0.25 $P_2S_5$)/15 LiBr/10 LiI, Li:S:P:Br:I (by mol)=1.375:1.500:0.375:0.150:0.100). The resultant sulfide-based solid electrolyte was analyzed through powdery X-ray diffractometry (XRD) in the same manner as in Example 1A, which confirmed absence of any other peak than the peaks derived from the raw materials.

The resultant, powdery amorphous sulfide-based solid electrolyte was heated at 195° C. for 3 hours using a hot plate set in a glove box, thereby giving a crystalline sulfide-based solid electrolyte. In powdery X-ray diffractometry (XRD) of the product, crystallization peaks were detected at 2θ=19.9°, 23.6° like in Example 1, which confirmed production of a crystalline sulfide-based solid electrolyte. The ion conductivity of the resultant crystalline sulfide-based solid electrolyte was measured according to the above (for measurement of ion conductivity), and was 5.57×10⁻³ (S/cm), which confirmed that the solid electrolyte has a high ion conductivity.

Figure 10:
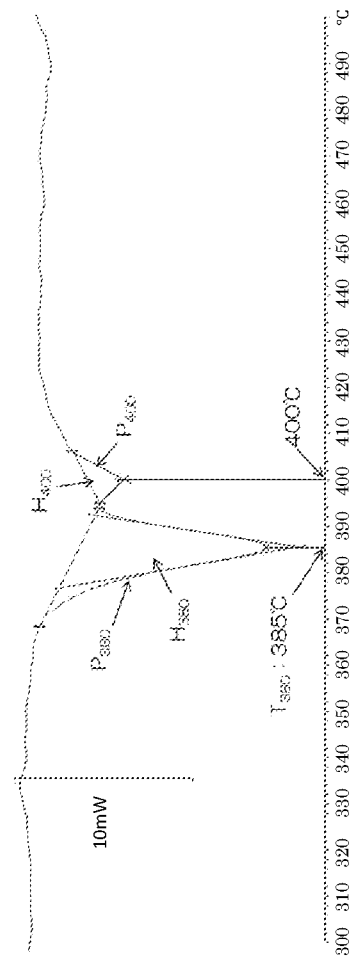
FIG. 10 is a DTA chart up to 300 to 500° C. in differential thermal analysis of the solid electrolyte obtained in Example 6B.

The resultant amorphous sulfide-based solid electrolyte was subjected to differential thermal analysis (DTA) under a heating condition of 10° C./min from room temperature up to 500° C. in a nitrogen gas atmosphere in the same manner as in Example 1B. FIG. 10 shows the differential thermal analysis chart (DTA chart). As in FIG. 10, an endothermic peak ($P_{380}$) having a peak top at 385° C. at 380±15° C., and an endothermic peak ($P_{400}$) having a peak top at 400° C. were detected, and the absolute value of the heat quantity at each endothermic peak is $H_{380}$ of 29.80 (J/g), and $H_{400}$ of 3.08 (J/g), and the ratio ($H_{380}/H_{350-450}$) is 90.6%. The condition, the heat quantity at each endothermic peak and the ion conductivity in Example 6B are shown in Table 2.

Comparative Example 1B

An amorphous sulfide-based solid electrolyte (75 (0.75 $Li_2S$/0.25 $P_2S_5$)/15 LiBr/10 LiI, Li:S:P:Br:I (by mol)=1.375:1.500:0.375:0.150:0.100) was produced in the same manner as in Example 1B, except that in Example 1B, 0.550 g of lithium sulfide, 0.887 g of diphosphorus pentasulfide and, in place of bromine and iodine, 0.277 g of lithium bromide and 0.285 g of lithium iodide were used. The resultant sulfide-based solid electrolyte was analyzed through powdery X-ray diffractometry (XRD) in the same manner as in Example 1A, in which any other peak than the peaks derived from the raw materials was not detected, and which confirmed that the product was an amorphous sulfide-based solid electrolyte.

As a result of composition analysis using an ICP emission spectrometer, Li:S:P:Br:I (by mol)=1.367:1.482:0.372:0.160:0.103.

The resultant amorphous sulfide-based solid electrolyte was heated at 210° C. for 3 hours to give a crystalline sulfide-based solid electrolyte. In powdery X-ray diffractometry (XRD) of the product, crystallization peaks were detected at 2θ=19.9°, 23.6° like in Example 1, which confirmed production of a crystalline sulfide-based solid electrolyte. The ion conductivity of the resultant crystalline sulfide-based solid electrolyte was measured, and was 5.04×10⁻³ (S/cm), which confirmed that the ion conductivity thereof was not so high like that of the ion conductivity of the crystalline sulfide-based solid electrolytes of Examples 1B to 6B. The condition and the ion conductivity in Comparative Example 1B are shown in Table 2.

Figure 11:
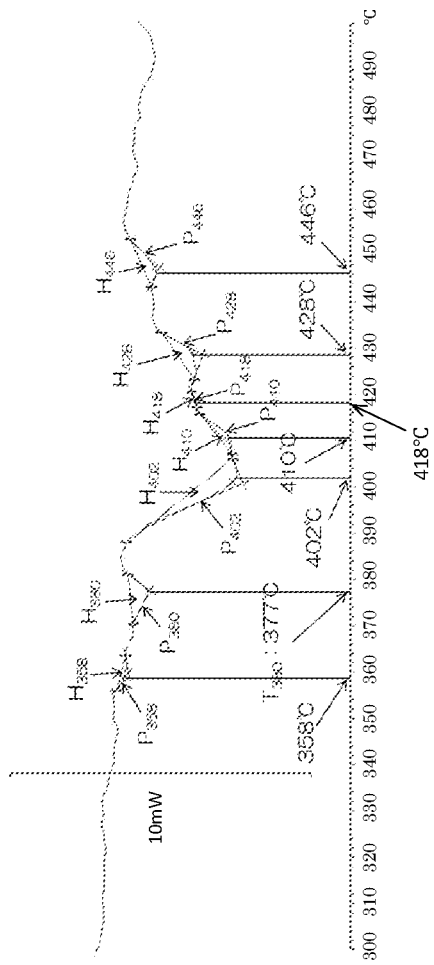
FIG. 11 is a DTA chart up to 300 to 500° C. in differential thermal analysis of the solid electrolyte obtained in Comparative Example 1B.

The resultant amorphous sulfide-based solid electrolyte was subjected to differential thermal analysis (DTA) under a heating condition of 10° C./min from room temperature up to 500° C. in a nitrogen gas atmosphere in the same manner as in Example 1B. FIG. 11 shows the differential thermal analysis chart (DTA chart). As in FIG. 11, an endothermic peak ($P_{358}$) having a peak top at 358° C., an endothermic peak ($P_{380}$) having a peak top at 377° C. at 380±15° C., an endothermic peak ($P_{402}$) having a peak top at 402° C., an endothermic peak ($P_{410}$) having a peak top at 410° C., an endothermic peak ($P_{418}$) having a peak top at 418° C., an endothermic peak ($P_{428}$) having a peak top at 428° C., and an endothermic peak ($P_{446}$) having a peak top at 446° C. were detected, and the absolute value of the heat quantity at each endothermic peak is $H_{358}$ of 0.22 (J/g), $H_{380}$ of 1.07 (J/g), $H_{402}$ of 2.54 (J/g), $H_{410}$ of 0.55 (J/g), $H_{418}$ of 0.025 (J/g), $H_{428}$ of 0.99 (J/g), and $H_{446}$ of 0.72 (J/g). The absolute value of the heat quantity $H_{380}$ at the endothermic peak ($P_{380}$) having a peak top at 380±15° C. is smaller than 10 (J/g), and the ratio ($H_{380}/H_{350-450}$) is 17.5%. The condition, the heat quantity at each endothermic peak and the ion conductivity in Comparative Example 1B are shown in Table 2.

Comparative Example 2B

An amorphous sulfide-based solid electrolyte (75 (0.75 $Li_2S$/0.25 $P_2S_5$)/15 LiBr/10 LiI, Li:S:P:Br:I (by mol)=1.375:1.500:0.375:0.150:0.100) was produced in the same manner as in Comparative Example 1A. The resultant sulfide-based solid electrolyte was analyzed through powdery X-ray diffractometry (XRD) in the same manner as in Example 1A, in which any other peak than the peaks derived from the raw materials was not detected, and which confirmed that the product was an amorphous sulfide-based solid electrolyte.

The resultant amorphous sulfide-based solid electrolyte was heated at 203° C. for 3 hours to give a crystalline sulfide-based solid electrolyte. In powdery X-ray diffractometry (XRD) of the product, crystallization peaks were detected at 2θ=19.9°, 23.6° like in Example 1, which confirmed production of a crystalline sulfide-based solid electrolyte. The ion conductivity of the resultant crystalline sulfide-based solid electrolyte was measured, and was 4.76×10⁻³ (S/cm), which confirmed that the ion conductivity thereof was not so high like that of the ion conductivity of the crystalline sulfide-based solid electrolytes of Examples 1B to 6B. The condition and the ion conductivity in Comparative Example 2B are shown in Table 1.

Figure 12:
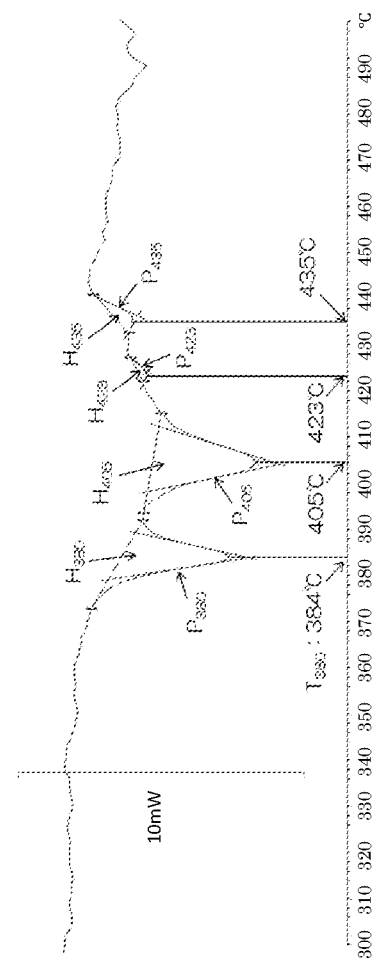
FIG. 12 is a DTA chart up to 300 to 500° C. in differential thermal analysis of the solid electrolyte obtained in Comparative Example 2B.

The resultant amorphous sulfide-based solid electrolyte was subjected to differential thermal analysis (DTA) under a heating condition of 10° C./min from room temperature up to 500° C. in a nitrogen gas atmosphere in the same manner as in Example 1B. FIG. 12 shows the differential thermal analysis chart (DTA chart). As in FIG. 12, an endothermic peak ($P_{380}$) having a peak top at 384° C. at 380±15° C., an endothermic peak ($P_{405}$) having a peak top at 405° C., an endothermic peak ($P_{423}$) having a peak top at 423° C., and an endothermic peak ($P_{435}$) having a peak top at 435° C. were detected, and the absolute value of the heat quantity at each endothermic peak is $H_{380}$ of 7.64 (J/g), $H_{405}$ of 10.14 (J/g), $H_{423}$ of 0.27 (J/g), and $H_{435}$ of 0.93 (J/g). The absolute value of the heat quantity $H_{380}$ at the endothermic peak ($P_{380}$) having a peak top at 380±15° C. is smaller than 10 (J/g), and the ratio ($H_{380}/H_{350-450}$) is 40.3%. The condition, the heat quantity at each endothermic peak and the ion conductivity in Comparative Example 2B are shown in Table 2.

Comparative Example 3B

An amorphous sulfide-based solid electrolyte (75 (0.75 $Li_2S$/0.25 $P_2S_5$)/15 LiBr/10 LiI, Li:S:P:Br:I (by mol)=1.375:1.500:0.375:0.150:0.100) was produced in the same manner as in Comparative Example 1B, except that in Comparative Example 1B, the solvent was changed from dewatered toluene to dewatered heptane (water content: 10 ppm or less). The resultant sulfide-based solid electrolyte was analyzed through powdery X-ray diffractometry (XRD) in the same manner as in Example 1A, in which any other peak than the peaks derived from the raw materials was not detected.

The resultant amorphous sulfide-based solid electrolyte was heated at 198° C. for 3 hours using a hot plate set in a glove box to give a crystalline sulfide-based solid electrolyte. In powdery X-ray diffractometry (XRD) of the product, crystallization peaks were detected at 2θ=19.9°, 23.6° like in Example 1, which confirmed production of a crystalline sulfide-based solid electrolyte. The ion conductivity of the resultant crystalline sulfide-based solid electrolyte was measured in the same manner as above (for measurement of ion conductivity), and was $5.16 \times 10^{-3}$ (S/cm), which confirmed that the ion conductivity thereof was not so high like that of the ion conductivity of the crystalline sulfide-based solid electrolytes of Examples 1B to 6B. The condition and the ion conductivity in Comparative Example 3B are shown in Table 2.

Figure 13:
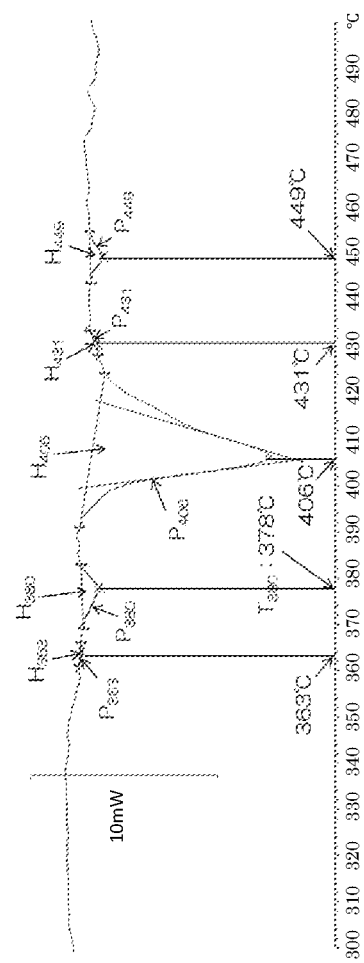
FIG. 13 is a DTA chart up to 300 to 500° C. in differential thermal analysis of the solid electrolyte obtained in Comparative Example 3B.

The resultant amorphous sulfide-based solid electrolyte was subjected to differential thermal analysis (DTA) under a heating condition of 10° C./min from room temperature up to 500° C. in a nitrogen gas atmosphere in the same manner as in Example 1B. FIG. 13 shows the differential thermal analysis chart (DTA chart). As in FIG. 13, an endothermic peak ($P_{363}$) having a peak top at 363° C., an endothermic peak ($P_{380}$) having a peak top at 378° C. at 380±15° C., an endothermic peak ($P_{406}$) having a peak top at 406° C., an endothermic peak ($P_{431}$) having a peak top at 431° C. and an endothermic peak ($P_{449}$) having a peak top at 449° C. were detected, and the absolute value of the heat quantity at each endothermic peak is $H_{363}$ of 0.11 (J/g), $H_{380}$ of 1.80 (J/g), $H_{406}$ of 34.95 (J/g), $H_{431}$ of 0.14 (J/g), and $H_{449}$ of 0.98 (J/g). The absolute value of the heat quantity $H_{380}$ at the endothermic peak ($P_{380}$) having a peak top at 380±15° C. is smaller than 10 (J/g), and the ratio ($H_{380}/H_{350-450}$) is 4.7%. The condition, the heat quantity at each endothermic peak and the ion conductivity in Comparative Example 3B are shown in Table 2.

TABLE 2

| | Halogen Source | Grinding Machine | Solvent*1 | Raw Materials Used and Blending Ratio (by mol) | Ion Conductivity S/cm | Endothermic Peak Top Temperature ° C. | Absolute Value of Heat Quantity at Endothermic Peak J/g | Ratio % |
|---|---|---|---|---|---|---|---|---|
| Example 1B | Substance $X_2$ | ball mill | Tol | 70.0:20.0:5.0:5.0 ($Li_2S:P_2S_5:Br_2:I_2$) | $5.20 \times 10^{-3}$ | 384 | 15.18 | 66.3 |
| | | | | | | 406 | 5.72 | |
| | | | | | | 427 | 0.63 | |
| | | | | | | 441 | 1.37 | |
| Example 2B | Substance $X_2$ | ball mill | Tol | 68.75:18.75:7.5:5.0 ($Li_2S:P_2S_5:Br_2:I_2$) | $5.41 \times 10^{-3}$ | 387 | 26.12 | 78.7 |
| | | | | | | 404 | 6.83 | |
| | | | | | | 422 | 0.22 | |
| Example 3B | Substance $X_2$ | ball mill | CB | 70.0:20.0:5.0:5.0 ($Li_2S:P_2S_5:Br_2:I_2$) | $5.74 \times 10^{-3}$ | 378 | 34.03 | 87.6 |
| | | | | | | 431 | 4.82 | |
| Example 4B | Substance $X_2$ | ball mill | CB | 68.75:18.75:7.5:5.0 ($Li_2S:P_2S_5:Br_2:I_2$) | $6.09 \times 10^{-3}$ | 386 | 48.35 | 99.7 |
| | | | | | | 413 | 0.13 | |
| Example 5B | Substance $X_2$ | bead mill | Tol | 68.75:18.75:7.5:5.0 ($Li_2S:P_2S_5:Br_2:I_2$) | $5.55 \times 10^{-3}$ | 386 | 33.72 | 84.9 |
| | | | | | | 404 | 5.42 | |
| | | | | | | 434 | 0.60 | |
| Example 6B | Substance $X_2$ | bead mill | CB | 68.75:18.75:7.5:5.0 ($Li_2S:P_2S_5:Br_2:I_2$) | $5.57 \times 10^{-3}$ | 385 | 29.80 | 90.6 |
| | | | | | | 400 | 3.08 | |
| Comparative Example 1B | Li Halide | ball mill | Tol | 56.25:18.75:15.0:10.0 ($Li_2S:P_2S_5:LiBr:LiI$) | $5.04 \times 10^{-3}$ | 358 | 0.22 | 17.5 |
| | | | | | | 377 | 1.07 | |
| | | | | | | 402 | 2.54 | |
| | | | | | | 410 | 0.55 | |
| | | | | | | 418 | 0.025 | |
| | | | | | | 428 | 0.99 | |
| | | | | | | 446 | 0.72 | |
| Comparative Example 2B | Li Halide | bead mill | Tol | 56.25:18.75:15.0:10.0 ($Li_2S:P_2S_5:LiBr:LiI$) | $4.76 \times 10^{-3}$ | 384 | 7.64 | 40.3 |
| | | | | | | 405 | 10.14 | |
| | | | | | | 423 | 0.27 | |
| | | | | | | 435 | 0.93 | |

TABLE 2-continued

| | Halogen Source | Grinding Machine | Solvent[*1] | Raw Materials Used and Blending Ratio (by mol) | Ion Conductivity S/cm | Endothermic Peak Top Temperature °C. | Absolute Value of Heat Quantity at Endothermic Peak J/g | Ratio % |
|---|---|---|---|---|---|---|---|---|
| Comparative Example 3B | Li Halide | ball mill | Hep | 56.25:18.75:15.0:10.0 ($Li_2S:P_2S_5:LiBr:LiI$) | $5.16 \times 10^{-3}$ | 363<br>378<br>406<br>431<br>449 | 0.11<br>1.80<br>34.95<br>0.14<br>0.98 | 4.7 |

[*1]Tol: toluene, CB: chlorobenzene, Hep: heptane

INDUSTRIAL APPLICABILITY

According to the production method for a solid electrolyte of this embodiment, a solid electrolyte having a high ion conductivity and excellent in battery performance can be produced not going through a step of removing water such as a drying step, while simplifying the production process and reducing the production cost. The solid electrolyte of this embodiment has a high ion conductivity and is excellent in battery performance. The solid electrolyte is favorably used for batteries, especially for batteries used in information-related equipments and communication instruments such as personal computers, video cameras, and mobile phones.

The invention claimed is:

1. A method for producing a sulfide-based solid electrolyte comprising an alkali metal, sulfur, phosphorus, and halogen, wherein the alkali metal sulfide is reacted with a substance represented by the formula (1) in an organic solvent by mixing, stirring, grinding, or a combination thereof:

$$X_2 \quad (1)$$

wherein X represents a halogen element.

2. A method for producing a sulfide-based solid electrolyte comprising an alkai metal sulfur phosphorus, and halogen, wherein, the alkali metal sulfide and a substance represented by the formula (1) and a phosphorus compound in an organic solvent by mixing, stirring, grinding, or a combination thereof:

$$X_2 \quad (1)$$

wherein X represents a halogen element.

3. The method for producing a sulfide-based solid electrolyte according to claim 1, wherein the phosphorus compound is phosphorus sulfide.

4. The method for producing a sulfide-based solid electrolyte according to claim 1, wherein the alkali metal sulfide is at least one selected from lithium sulfide and sodium sulfide.

5. The method for producing a sulfide-based solid electrolyte according to claim 2, wherein the substance is at least one selected from iodine and bromine.

6. The method for producing a sulfide-based solid electrolyte according to claim 2, wherein the content of the substance $X_2$ relative to the total amount of the alkali metal sulfide, the phosphorus compound and the substance $X_2$ is 1 to 50 mol %.

7. The method for producing a sulfide-based solid electrolyte according to claim 1, wherein the alkali metal sulfide is lithium sulfide, the phosphorus compound is diphosphorus pentasulfide, and the ratio of the molar number of lithium sulfide excluding the same molar number of lithium sulfide as the molar number of the substance $X_2$, relative to the total molar number of lithium sulfide and diphosphorus pentasulfide excluding the same molar number of lithium sulfide as the molar number of the substance $X_2$ is 60 to 90%.

8. The method for producing a sulfide-based solid electrolyte according to claim 1, wherein the solvent is a hydrocarbon solvent.

9. The method for producing a sulfide-based solid electrolyte according to claim 1, wherein the solvent is one in which the solubility of the substance represented by the formula (1) is 0.01% by mass or more.

10. The method for producing a sulfide-based solid electrolyte according to claim 1, wherein a grinding machine is used for the reaction.

11. A sulfide-based solid electrolyte comprising an alkali metal element, a sulfur element and a halogen element, which is such that the absolute value of the heat quantity $H_{380}$ of an endothermic peak that has a peak top at 380±15° C., as measured in differential heat analysis under a heating condition of 10° C./min, is 10 (J/g) or more.

12. The sulfide-based solid electrolyte according to claim 11, further comprising a phosphorus atom.

13. The sulfide-based solid electrolyte according to claim 11, wherein the ratio of the absolute value of the heat quantity $H_{380}$ of the endothermic peak to the total $H_{350-450}$ of the absolute values of the heat quantities of the endothermic peaks each having a peak top at 350 to 450° C. ($H_{380}/H_{350-450}$) is 50% or more.

14. The sulfide-based solid electrolyte according to claim 11, wherein the alkali metal element is at least one selected from a lithium element and a sodium element.

15. The sulfide-based solid electrolyte according to claim 11, wherein the halogen element is at least one selected from bromine and iodine.

16. The sulfide-based solid electrolyte according to claim 12, wherein the molar ratio of the alkali metal element, the sulfur element, the phosphorus element and the halogen element is (1.0 to 1.8)/(1.0 to 2.0)/(0.1 to 0.8)/(0.01 to 0.6).

17. The sulfide-based solid electrolyte according to claim 12, wherein the halogen element contains bromine and iodine and the molar ratio of the alkali metal element, the sulfur element, the phosphorus element, bromine and iodine is (1.0 to 1.8)/(1.0 to 2.0)/(0.1 to 0.8)/(0.01 to 0.3)/(0.01 to 0.3).

18. The sulfide-based solid electrolyte according to claim 11, having a crystal structure that has peaks at 2θ=20.2°±0.5° and 23.6°±0.5°.

* * * * *

UNITED STATES PATENT AND TRADEMARK OFFICE
CERTIFICATE OF CORRECTION

| | |
|---|---|
| PATENT NO. | : 11,038,198 B2 |
| APPLICATION NO. | : 16/084114 |
| DATED | : June 15, 2021 |
| INVENTOR(S) | : Makino et al. |

It is certified that error appears in the above-identified patent and that said Letters Patent is hereby corrected as shown below:

In the Claims

Column 31, Claim 2, Line 39 should read:
--comprising an alkai metal-- should be "comprising an alkali metal"

Signed and Sealed this
Seventh Day of December, 2021

Drew Hirshfeld
*Performing the Functions and Duties of the
Under Secretary of Commerce for Intellectual Property and
Director of the United States Patent and Trademark Office*